(12) United States Patent
Edge et al.

(10) Patent No.: US 9,154,907 B2
(45) Date of Patent: Oct. 6, 2015

(54) EFFICIENT PERIODIC LOCATION REPORTING IN A RADIO ACCESS NETWORK

(75) Inventors: Stephen W. Edge, Escondido, CA (US); Sven Fischer, Nuremberg (DE); Kirk Allan Burroughs, Alamo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 880 days.

(21) Appl. No.: 11/471,039

(22) Filed: Jun. 19, 2006

(65) Prior Publication Data

US 2006/0293066 A1    Dec. 28, 2006

Related U.S. Application Data

(60) Provisional application No. 60/693,003, filed on Jun. 21, 2005, provisional application No. 60/711,801, filed on Aug. 25, 2005, provisional application No. 60/718,112, filed on Sep. 16, 2005, provisional application No. 60/771,217, filed on Feb. 7, 2006, provisional application No. 60/771,706, filed on Feb. 8, 2006.

(51) Int. Cl.
*H04W 24/00*   (2009.01)
*H04W 4/02*    (2009.01)
(Continued)

(52) U.S. Cl.
CPC .............. *H04W 4/02* (2013.01); *H04W 64/00* (2013.01); *H04W 8/18* (2013.01)

(58) Field of Classification Search
CPC ......... H04W 8/10; H04W 64/00; H04W 4/02; H04L 29/08108; H04L 29/08936

USPC ................ 455/456.3, 456.1, 436, 422.1, 433; 370/328, 338; 701/408
See application file for complete search history.

(56) References Cited

U.S. PATENT DOCUMENTS 6,313,787 B1 * 11/2001 King et al. ............... 342/357.03
6,353,743 B1   3/2002 Karmel
(Continued)

FOREIGN PATENT DOCUMENTS

CN          1620178 A     5/2005
EP          1617686       1/2006
(Continued)

OTHER PUBLICATIONS

"Universal Mobile Telecommunications System (UMTS)," ETSI Standards, European Telecommunications Standards Institute, Sophia-Antipo, FR, vol. 3-R2, No. V610, Jun. 2004.
(Continued)

*Primary Examiner* — Mahendra Patel
(74) *Attorney, Agent, or Firm* — Jimmy Cheng

(57) ABSTRACT

A user equipment (UE) communicating with a radio access network (RAN) sends to a network entity (e.g., an MSC/SGSN) a request for periodic reporting of the UE location to a client entity. After the request is approved, the MSC/SGSN sends to the RAN signaling to initiate periodic location reporting for the UE. The RAN may request a positioning center (e.g., a SAS) to send assistance data to the UE. The RAN may coordinate and control the periodic location reporting or may pass the control over to the positioning center. For each location reporting, the UE sends location information (e.g., measurements made by the UE or a location estimate computed by the UE) to the RAN. The SAS computes a location estimate if the UE sends measurements. The RAN then sends the location estimate for the UE to the MSC/SGSN, which forwards the location estimate toward the client entity.

56 Claims, 14 Drawing Sheets

(51) Int. Cl.
*H04W 64/00* (2009.01)
*H04W 8/18* (2009.01)

(56) References Cited

U.S. PATENT DOCUMENTS

| | | |
|---|---|---|
| 6,369,751 B1 | 4/2002 | Naruse |
| 6,453,237 B1 | 9/2002 | Fuchs et al. |
| 6,718,177 B1 | 4/2004 | Comer et al. |
| 6,788,253 B1* | 9/2004 | Calin ............... 342/464 |
| 6,898,433 B1* | 5/2005 | Rajaniemi et al. ......... 455/456.1 |
| 6,975,941 B1 | 12/2005 | Lau et al. |
| 7,016,693 B2 | 3/2006 | Guyot |
| 7,054,620 B2 | 5/2006 | Ewert et al. |
| 7,218,940 B2 | 5/2007 | Niemenmaa et al. |
| 7,277,711 B2 | 10/2007 | Nyu |
| 7,421,277 B2 | 9/2008 | Burroughs |
| 7,424,293 B2 | 9/2008 | Zhu |
| 7,536,695 B2 | 5/2009 | Alam et al. |
| 7,627,332 B2 | 12/2009 | Shim |
| 7,706,813 B2 | 4/2010 | Shim |
| 7,869,817 B2 | 1/2011 | Shim |
| 7,925,276 B2 | 4/2011 | Shim |
| 7,974,639 B2 | 7/2011 | Burroughs et al. |
| 8,068,056 B2 | 11/2011 | Wachter et al. |
| 8,755,818 B2 | 6/2014 | Wachter et al. |
| 8,792,902 B2 | 7/2014 | Edge et al. |
| 8,874,134 B2 | 10/2014 | Edge et al. |
| 2003/0225515 A1 | 12/2003 | Havlark et al. |
| 2004/0003125 A1* | 1/2004 | Ichimura ............... 709/249 |
| 2004/0106414 A1* | 6/2004 | Ewert et al. ............... 455/456.1 |
| 2004/0137918 A1 | 7/2004 | Varonen et al. |
| 2004/0192337 A1 | 9/2004 | Hines et al. |
| 2004/0193707 A1* | 9/2004 | Alam et al. ............... 709/223 |
| 2004/0203914 A1 | 10/2004 | Kall et al. |
| 2004/0253964 A1 | 12/2004 | Zhu |
| 2005/0020276 A1* | 1/2005 | Maanoja et al. ............. 455/456.1 |
| 2005/0043038 A1 | 2/2005 | Maanoja et al. |
| 2005/0075099 A1* | 4/2005 | Guyot ............... 455/414.1 |
| 2005/0118999 A1 | 6/2005 | Zhu |
| 2005/0125493 A1 | 6/2005 | Chaskar et al. |
| 2005/0136942 A1* | 6/2005 | Timiri et al. ............... 455/456.1 |
| 2005/0148340 A1* | 7/2005 | Guyot ............... 455/456.2 |
| 2005/0153706 A1 | 7/2005 | Niemenmaa et al. |
| 2005/0239480 A1 | 10/2005 | Kim et al. |
| 2006/0036680 A1 | 2/2006 | Shim |
| 2006/0099958 A1 | 5/2006 | Gustafsson et al. |
| 2006/0099960 A1 | 5/2006 | Duan |
| 2006/0099961 A1 | 5/2006 | Duan |
| 2006/0135174 A1 | 6/2006 | Kraufvelin et al. |
| 2006/0258371 A1 | 11/2006 | Krishnamurthi et al. |
| 2006/0274696 A1* | 12/2006 | Krishnamurthi ............... 370/331 |
| 2007/0026871 A1 | 2/2007 | Wager |
| 2007/0054675 A1 | 3/2007 | Duan |
| 2007/0054676 A1 | 3/2007 | Duan et al. |
| 2007/0173253 A1 | 7/2007 | Duan et al. |
| 2008/0139218 A1 | 6/2008 | Duan |
| 2010/0173607 A1 | 7/2010 | Thornton et al. |
| 2011/0319095 A1 | 12/2011 | Burroughs et al. |
| 2015/0005006 A1 | 1/2015 | Wachter et al. |

FOREIGN PATENT DOCUMENTS

| | | | |
|---|---|---|---|
| EP | 1617686 A1 * | 1/2006 | ............... H04Q 7/00 |
| EP | 1638350 | 3/2006 | |
| EP | 1686814 | 8/2006 | |
| JP | 2001346264 A | 12/2001 | |
| JP | 2003235070 A | 8/2003 | |
| JP | 2004061187 | 2/2004 | |
| JP | 2004279409 A | 10/2004 | |
| JP | 2006526338 | 11/2006 | |
| JP | 2007511967 | 5/2007 | |
| JP | 2007534180 | 11/2007 | |
| KR | 20030015577 | 2/2003 | |
| RU | 2002121494 | 3/2004 | |
| WO | WO9711384 A1 | 3/1997 | |
| WO | 03045101 | 5/2003 | |
| WO | WO03061322 A1 | 7/2003 | |
| WO | 2004112410 | 12/2004 | |
| WO | 2004114688 | 12/2004 | |
| WO | WO-2004114689 A1 | 12/2004 | |
| WO | 2005051009 | 6/2005 | |
| WO | WO2005069670 A1 | 7/2005 | |

OTHER PUBLICATIONS

3GPP TS 23.032 V6.0.0 (Dec. 2004), 3rd Generation Partnership Poject; Technical Specification Group Core Network; Universal Geographical Area Description (GAD) (Re:ease 6).
3GPP TS 23.171 v3.11.0; "3rd Generation Partnership Project; Technical Specification Group Services and System Aspects; Functional stage 2 description of location services in UMTS," 3GPP TS 23.171 version 3.11.0 Release 1999 (Mar. 2004).
3GPP TS 23.271 v6.10.0; "3rd Generation Partnership Project; Technical Specification Group Services and System Aspects; Functional stage 2 desoription of Location Services (LCS)," 3GPP TS 23.271 version 6 10.0 Reiease 6 (Dec. 2004).
3GPP TS 23.271 v7,1.0; "3rd Generation Partnership Project; Technical Specification Group Services and System Aspects; Functional stage 2 description of Location Services (LCS)," 3GPP TS 23.271 version 7.1.0 Release 7 (Jun. 2005).
3GPP TS 24.080 v6.3.0; "3rd Generation Partnership Project; Technical Specification Group Core Network; Mobile radio interface layer 3 supplementary services specification; Formats and coding," 3GPP TS 24.080 version 6.3.0 Release 6 (Mar. 2005).
3GPP TS 25 453 v6.9.0; "3rd Generation Partnership Project; Technical Specification Group Radio Access Network; UTRAN Iupc interface Positioning Calculation Application Part (PCAP) signalling," 3GPP TS 25.453 version 6.9.0 Release 6 (Jun. 2005).
3GPP TS 43.059 V6.1.0 (Jun. 2003); 3rd Generation Partnership Project; Technical Specification Group GSM/EDGE Radio Access Network; Functional stage 2 description of Location Services (LCS) in GERAN (Release 6).
3GPP TS 43.059 v7.0.0; "3rd Generation Partnership Project; Technical Specification Group GSM/EDGE Radio Access Network; Functional stage 2 description of Location Services (LCS) in GERAN," 3GPP TS 43.059 versioni 7.0.0 Release 7 (Apr. 2005).
3GPP2 X.S0002 v1.0.0: "TIA/EIA-41-D Location Services Enhancements," IS-881,3GPP2 X.S002 version 1.0.0 Revision 0 (Mar. 2004).
3GPP2 X.S0024 v1.0; "IP-Based Location Services," 3GPP2 X.S0024 version 1.0 Revision 0 (Oct. 2005).
ETSI TS 123 271 v6.11.0; "Digital Cellular Telecommunications System (Phase 2+): Universal Mobile Telecommunications System (UMTS), Functional stage 2 description of Location Services (LCS)," XP014027546. 3GPP TS 23.271 version 6.11.0 Release 6 (Mar. 2005).
OMA-AD-SUPL-V1_0-20050719-C; "Secure User Place Location Architecture," Open Mobile Alliance, Candidate Version 1.0, XP002410620, Jul. 19, 2005.
OMA-AD-SUPL-V2_0-20060619-D: "Secure User Plane Location Architecture," Open Mobile Alliance, Draft Version 4.0, Jun. 19, 2006.
OMA-TS-ULP-V1_0-20060704-C: "User Plane Location Protocol," Open Mobile Allance, Candidate Version 1.0, Jan. 22, 2007.
OMA-TS-ULP-V2_0-20060727-D; "UserPlane Location Protocol," Open Mobile Alliance, Draft Version 2.0, Jul. 27, 2006.
Qualcomm Incorporated: "S2-051535: Efficient Support of Periodic Location," 3GPP TSG SA WG2 S2#47, [Online] Jun. 27, 2005-Jul. 1, 2005, pp. 1-14, XP002405914, Montreal, Canada.
Qualcomm, "S2-051536: CR: 23.271: Addition of Periodic Location Procedures," 3GPP TSG-SA WG2 Meeting #47, Jul. 1, 2005, pp. 1-26, XP-002410621, Montreal, Canada.
TIA-801-A; "Position Determination Service for cdrna2000 Spread Spectrum Systems," Revision of TlA-801-A, Telecommunications Industry Association, Apr. 2004.
International Search Report—PCT/US2006/024326, International Search Authority—European Patent Office—Nov. 13, 2006.

(56) References Cited

OTHER PUBLICATIONS

Written Opinion—PCT/US2006/024328, International Search Authority—European Patent Office—Nov. 13, 2006.

International Preliminary Report on Patentability—PCT/US2006/024328, International Bureau of WIPO—Geneva, Switzerland—Dec. 24, 2007.

European Search Report—EP12164006—Search Authority—Munich—Apr. 23, 2014.

3GPP TSG-RAN WG3: "Addition of the U-TDOA location method to the UTRAN", Cingular Wireless, T-Mobile USA, Andrew Corporation, TruePosition, 3GPP TSG-RAN WG3 Meeting #47, R3-050764, May 13, 2005, pp. 1-37.

Defendant QUALCOMM Incorporated, Snaptrack, Inc. and Norman Krasner's Answer to Fourth Amended Complaint, Case 3:08-cv-01992-MMA-POR, Document 54, pp. 1-26. Jan. 21, 2010.

Duan, "A Disposal Method of Location Information Request in the Location Service", Wipo, Jan. 13, 2005, p. 1.

Oma, "Secure User Plane Location Architecture," Nov. 21, 2005, Open Mobile Alliance (OMA), Candidate Version 1.0, 80 pages.

Open Mobile Alliance: "Secure User Plane Location Architecture," OMA-AD-SUPL-V1_0- 20050719-C, Jul. 19, 2005, Candidate Version 1.0, pp. 1-80.

"Order Rescheduling Early Neutral Evaluation," United States District Court Civil Case No. 3:08-cv-01992-MMA-POR, Document 57, p. 1, Mar. 1, 2010.

"Plaintiffs' First Amended Complaint," United States District Court Case:3:08-cv-01992-MMA-POR, Document 14, pp. 1-39. Apr. 29, 2009.

"Plaintiffs' Fourth Amended Complaint", United States District Court Case 3:08-cv-01992-MMA-POR, Document 53, pp. 1-33, Jan. 11, 2010.

"Plaintiffs' Original Complaint," United States District Court Case:3:08-cv-01992-BEN-NLS, pp. 1-34, Oct. 24, 2008.

"Plaintiffs' Second Amended Complaint," United States District Court Case:3:08-cv-01992-MMA-POR, Document 36, pp. 1-40, Sep. 14, 2009.

"Plaintiffs' Third Amended Complaint," United States District Court Case:3:08-cv-01992-MMA-POR, Document 40, pp. 1-35, Oct. 9, 2009.

Secure User Plane Location Architecture, OMA, Draft Version 1 .0, Nov 1, 2004, pp. 57.

Wang J., et al., "OMA-LOC-2004-136R03-CR_SUPL_AD_Message_Periodic Call Flows", Jun. 2004, URL, http://member.openmobilealliance.org/ftp/Public_documents/LOC/2004/OMA-LOC-2004-0136R03-SUPL_Periodic_Call_Flows.zip.

European Search Report—EP14193340—Search Authority—Munich—Mar. 20, 2015.

* cited by examiner

EFFICIENT PERIODIC LOCATION REPORTING IN A RADIO ACCESS NETWORK

The present application claims priority to provisional U.S. Application Ser. No. 60/693,003, entitled "METHOD AND APPARATUS FOR PROVIDING LOCATION SERVICES WITH SHORT-CIRCUITED MESSAGE FLOWS," filed Jun. 21, 2005; U.S. Application Ser. No. 60/711,801, entitled "EFFICIENT PERIODIC LOCATION REPORTING IN A RADIO ACCESS NETWORK," filed Aug. 25, 2005; U.S. Application Ser. No. 60/718,112, entitled "EFFICIENT PERIODIC LOCATION REPORTING IN A RADIO ACCESS NETWORK," filed Sep. 16, 2005; U.S. Application Ser. No. 60/771,180, entitled "EFFICIENT PERIODIC LOCATION REPORTING IN A RADIO ACCESS NETWORK," filed Feb. 6, 2006; U.S. Application Ser. No. 60/771,217, entitled "CLARIFICATION AND CORRECTION OF PERIODIC LOCATION PROCEDURE," filed Feb. 7, 2006; U.S. Application Ser. No. 60/771,706, entitled "ADDITION OF PERIODIC LOCATION PROCEDURES," filed Feb. 8, 2006, all assigned to the assignee hereof and incorporated herein by reference.

BACKGROUND

1. Field

The present disclosure relates generally to communication, and more specifically to techniques for providing location services.

2. Background

It is often desirable, and sometimes necessary, to know the location of a wireless device in a network. For example, a wireless user may utilize the wireless device to browse through a website and may click on location sensitive content. The web server may then query the network for the location of the wireless device. The network would initiate location processing with the wireless device in order to ascertain the location of the wireless device. The network would then return a location estimate for the wireless device to the web server, which may use this location estimate to provide appropriate content to the wireless user. There are many other scenarios in which knowledge of the location of the wireless device is useful or necessary. In the following description, the terms "location" and "position" are synonymous and are used interchangeably.

A message flow (which may also be called a call flow or a procedure) is typically executed in order to obtain a location estimate for the wireless device and to send this location estimate to a client entity (e.g., the web server). Various messages are typically exchanged between one or more network entities, the wireless device, and the client entity for the message flow. These messages ensure that each entity is provided with pertinent information, or can obtain this information from another entity, in order to carry out positioning for the wireless device and/or to deliver the location estimate to the client entity. However, these messages add to the traffic among the various network entities. The additional traffic may be especially great for periodic location reporting, which periodically provides a location estimate for the wireless device to the client entity. The messages may also extend the response time for sending the location estimate to the client entity, possibly by an unacceptable amount.

There is therefore a need in the art for techniques to efficiently provide location services.

SUMMARY

Techniques for efficiently providing location services (LCS) using periodic LCS capabilities of a radio access network (RAN) are described herein. These techniques utilize RAN-based periodic location reporting to periodically report the location of a wireless device to an LCS client. The RAN-based periodic location reporting may be used for mobile terminated location request (MT-LR), network induced location request (NI-LR), and mobile originated location request (MO-LR) procedures for periodic location reporting.

In an embodiment of MO-LR periodic location reporting, a wireless device communicating with a RAN sends to a network entity (1) a request for periodic reporting of the UE location to a client entity and (2) periodic location information. The wireless device is also called a user equipment (UE), the network entity may be a mobile services switching center (MSC) or a serving GPRS support node (SGSN), and the client entity is also called an LCS client. The periodic location information may indicate a schedule of reporting events and/or a set of predetermined events that trigger location reporting. After the request is approved, the MSC/SGSN sends to the RAN signaling to initiate periodic location reporting for the UE. The RAN may request a positioning center (which may be called a standalone serving mobile location center (SAS)) to send assistance data to the UE. The RAN may coordinate and control the periodic location reporting or may pass the control over to the SAS. In any case, for each location reporting determined by the periodic location information, the UE sends location information to the RAN. This location information may comprise (1) measurements made by the UE for base stations and/or satellites or (2) a location estimate for the UE. If the RAN receives measurements from the UE, then the RAN may send the measurements to the SAS, which may compute the location estimate for the UE and return the location estimate to the RAN. The RAN then sends the location estimate for the UE to the MSC/SGSN, which forwards the location estimate toward the LCS client. The RAN-based periodic location reporting reduces signaling to periodically send the UE location estimate to the LCS client and also provides a faster response time.

Various message flows for RAN-based periodic location reporting are described below. Various aspects and embodiments of the invention are also described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The periodic location reporting techniques described herein may be used for various wireless networks such as a Code Division Multiple Access (CDMA) network, a Time Division Multiple Access (TDMA) network, a Frequency Division Multiple Access (FDMA) network, an Orthogonal Frequency Division Multiple Access (OFDMA) network, a network supporting a combination of the aforementioned technologies, a network with wide area network coverage as well as wireless local area network (WLAN) coverage, and so on. A CDMA network may implement one or more CDMA radio technologies such as Wideband-CDMA (W-CDMA), cdma2000, and so on. cdma2000 covers IS-2000, IS-856, and IS-95 standards. A TDMA network may implement one or more TDMA radio technologies such as Global System for Mobile Communications (GSM), Digital Advanced Mobile Phone System (D-AMPS), and so on. D-AMPS covers IS-136 and IS-54. These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. For clarity, the techniques are described below for a 3GPP-based network that utilizes one or more radio technologies and one or more networking protocols promulgated by 3GPP. For example, a 3GPP-based network may be a Universal Mobile Telecommunication System (UMTS) network that utilizes W-CDMA as the radio technology for over-the-air communication and Mobile Application Part (MAP) as the networking protocol for core network functionality.

Figure 1A:
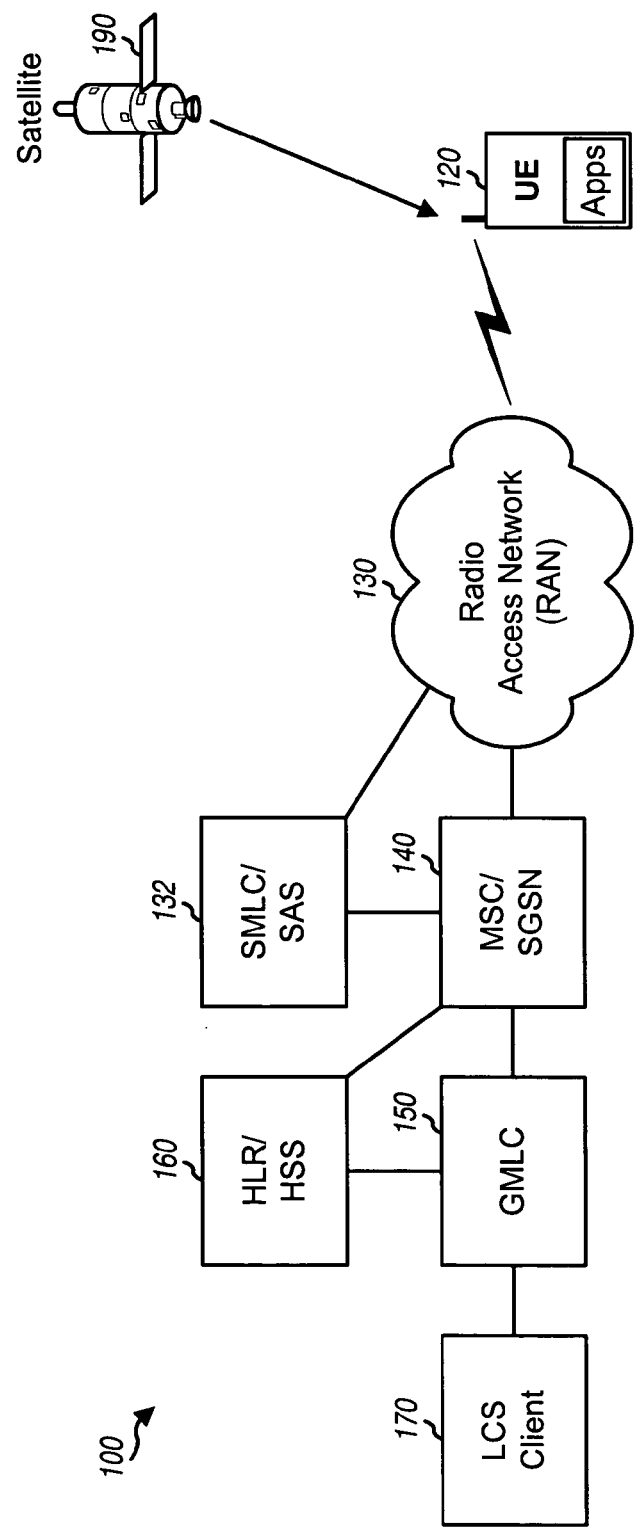
FIG. 1A shows a 3GPP-based network.

FIG. 1A shows a 3GPP-based network 100 that provides communication and location services for wireless devices, which are called UEs (3GPP terminology) in the following description. For simplicity, only one UE 120 is shown in FIG. 1A. UE 120 may be fixed or mobile and may also be called a mobile station, a terminal, a subscriber unit, or some other terminology. UE 120 may also be a cellular phone, a laptop, a personal digital assistant (PDA), a telemetry device, a tracking device, and so on. UE 120 may communicate with one or more base stations in a radio access network (RAN) 130. UE 120 may also receive signals from one or more satellites 190, which may be part of the Global Positioning System (GPS), the European Galileo system, or the Russian Glonass system. UE 120 may measure signals from base stations in RAN 130 and/or signals from satellites 190 and may obtain pseudo-range measurements for these base stations and satellites. These pseudo-range measurements may be used to derive a location estimate for the UE.

RAN 130 provides wireless communication for UEs located throughout the coverage area of the RAN. RAN 130 communicates with a mobile services switching center (MSC) and/or a serving GPRS support node (SGSN) (MSC/SGSN) 140 and also communicates with a serving mobile location center (SMLC) and/or a standalone SMLC (SAS) (SMLC/SAS) 132. MSC 140 performs switching functions for circuit-switched calls (e.g., setup, routing, and eventual release of circuit-switched voice and data calls) for UEs within its coverage area. SGSN 140 performs switching and routing functions for packet-switched calls and packet-switched connections. SMLC/SAS 132 provides positioning services and may support UE-based, UE-assisted, and network-based positioning modes. Positioning refers to a functionality that detects or determines a geographical location of a target UE. An SAS may have several associated Location Measurement Units (LMUs) (not shown in FIG. 1A) to assist certain positioning methods, e.g., Uplink Time Difference of Arrival (U-TDOA) positioning method. An SMLC may be a physical and/or logical part of a RAN or it may be physically and logically separate in the case of a standalone SMLC (SAS). In any case, in the following description SMLC/SAS 132 is treated as a distinct entity whether or not it is physically and/or logically part of or separate from a RAN.

A gateway mobile location center (GMLC) 150 performs various functions to support location services, interfaces with external LCS clients, and provides services such as subscriber privacy, authorization, authentication, billing, and so on. A home location register (HLR)/home subscriber server (HSS) 160 stores registration information for UEs (e.g., UE 120) that are subscribers of network 100. An LCS client 170 is a function or an entity that requests and/or receives location information for LCS targets. An LCS target is a UE whose location is being sought. In general, an LCS client may reside in a network entity or a UE or may be external to both the network and the UE. LCS client 170 communicates with GLMC 150.

For simplicity, FIG. 1A shows network entities that are pertinent for location services. These network entities are described in 3GPP TS 23.271, entitled "Functional stage 2 description of Location Services (LCS) (Release 6)," in 3GPP TS 25.305, entitled "Stage 2 functional specification of User Equipment (UE) positioning in UTRAN (Release 6)," and in 3GPP TS 43.059, entitled "Functional stage 2 description of Location Services (LCS) in GERAN (Release 6)," all of which are publicly available.

FIG. 1A shows a case in which UE 120 communicates with a single network (e.g., the home network). All of the network entities in this network communicate via a core network and/or other data networks (not shown in FIG. 1A). UE 120 may be roaming and may communicate with different visited networks.

Figure 1B:
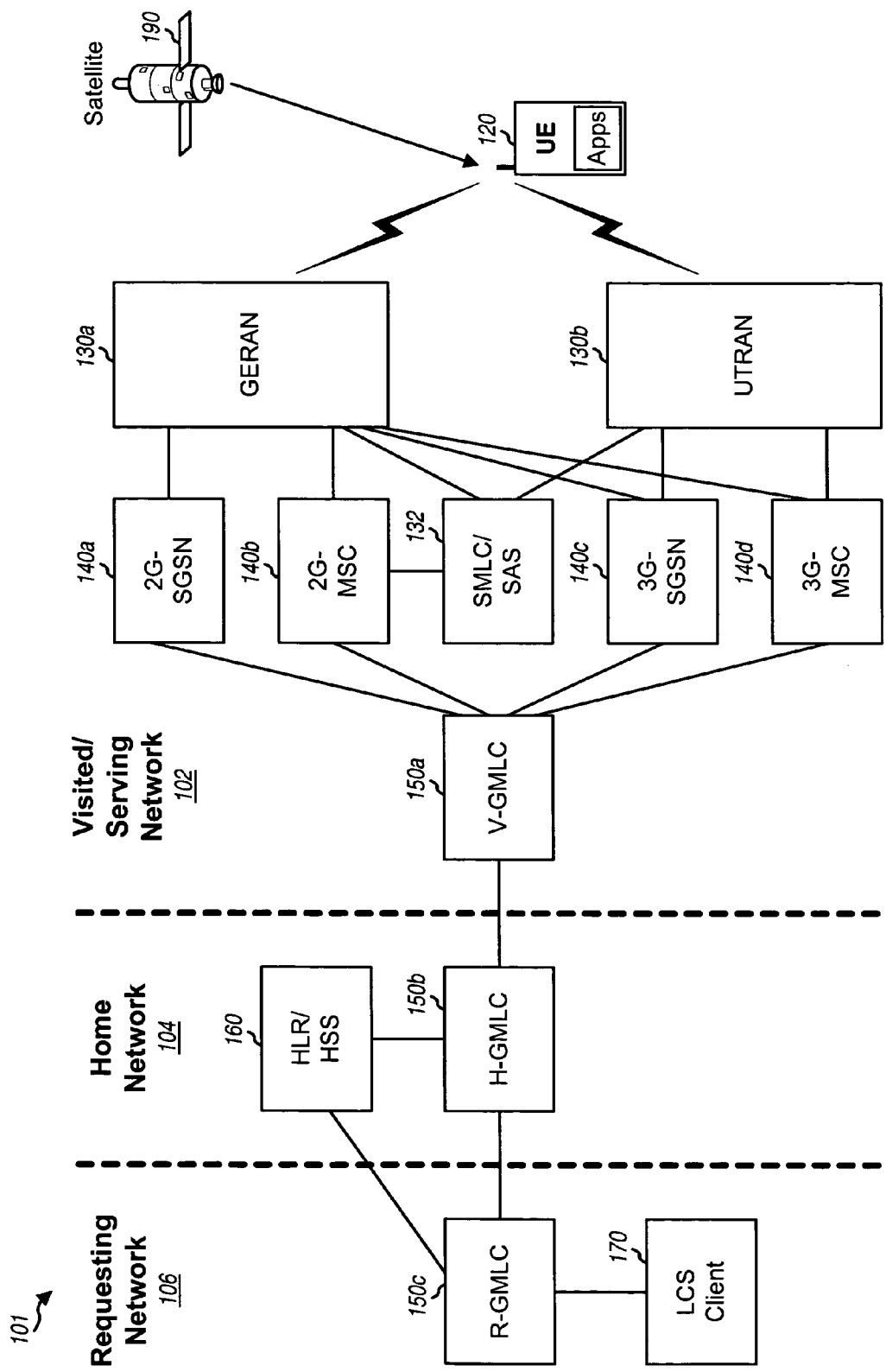
FIG. 1B shows a 3GPP-based deployment that includes multiple networks.

FIG. 1B shows a 3GPP-based deployment 101 that includes a visited/serving network 102, a home network 104, and a requesting network 106. Visited network 102 is a network that is currently serving UE 120. Home network 104 is a network with which UE 120 has a subscription. Requesting network 106 is a network via which LCS client 170 may originate a request for the location of UE 120 and/or receive the location of UE 120. Home network 104 may be the same as or different from visited network 102 and may be the same as or different from requesting network 106. Requesting network 106 may also be the same as or different from visited network 102. Each network may be referred to as a public land mobile network (PLMN).

For the embodiment shown in FIG. 1B, visited network 102 includes a second generation (2G) GSM EDGE Radio Access Network (GERAN) 130*a* and a third generation (3G) Universal Terrestrial Radio Access Network (UTRAN) 130*b*. GERAN 130*a* communicates with a 2G-SGSN 140*a* and/or a 2G-MSC 140*b*. GERAN 130*a* may also communicate with a 3G-SGSN 140*c* and/or a 3G-MSC 140*d*. UTRAN 130*b* communicates with 3G-SGSN 140*c* and/or 3G-MSC 140*d*. Each MSC may act as a visited MSC (VMSC) and 3G-MSC 140*d* may be an MSC server. A visited GMLC (V-GMLC) 150*a* supports location services for visited network 102 and communicates with MSCs 140*b* and 140*d* and SGSNs 140*a* and 140*c*. SMLC/SAS 132 provides positioning services and may communicate with GERAN 130*a*, UTRAN 130*b*, 2G-MSC 140*a*, and so on.

Home network 104 includes a home GMLC (H-GMLC) 150*b* and HLR/HSS 160. H-GMLC 150*b* supports location services for home network 104. HLR/HSS 160 stores registration information for UEs that are subscribers of home network 104. Requesting network 106 includes a requesting GLMC (R-GLMC) 150*c* that supports location services for requesting network 106. Although not shown in FIG. 1B, R-GLMC 150*c* and/or H-GLMC 150*b* may communicate directly with SGSN 140*a*, MSC 140*b*, SGSN 140*c*, and/or MSC 140*d* in visited network 102 via appropriate interfaces.

The network entities in FIGS. 1A and 1B may also be referred to by other names in other networks and other location architectures. For example, in a Secure User Plane Location (SUPL) architecture promulgated by Open Mobile Alliance (OMA), an LCS client is sometimes referred to as a SUPL agent, a GLMC is called a SUPL location center (SLC), a UE that supports SUPL is called a SUPL enabled terminal (SET), and an SLMC is called a SUPL positioning center (SPC). The functions and signaling performed by these SUPL named entities are not exactly the same as those performed by the corresponding 3GPP named entities but are broadly similar, enabling comparable services and capabilities. A GLMC may also be called a location center, an LCS server, a location server, a mobile positioning center (MPC), and so on. An SMLC may also be called a positioning entity, a positioning center, a position determination entity (PDE), and so on. In general, each network may include any collection of network entities that can provide any range of services. For clarity, much of the following description is for 3GPP-based network 100 in FIG. 1A.

The location of UE 120 may be requested by (1) applications (Apps) running at the UE, which results in mobile originated location request (MO-LR), (2) applications running at LCS client 170, which results in mobile terminated location request (MT-LR), and (3) applications running inside any of the PLMN entities serving the target UE (e.g., 2G-SGSN 140*a*, 2G-MSC 140*b*, 3G-SGSN 140*c* or 3G-MSC 140*d* in FIG. 1B), which results in network induced location request (NI-LR). The location of UE 120 may be requested one time, which results in one-shot or immediate location reporting, or multiple times with a single request, which results in periodic location reporting. Periodic location reporting may be achieved with a periodic MT-LR message flow, a periodic NI-LR message flow, or a periodic MO-LR message flow. Periodic location reporting provides a location estimate for the target UE to the LCS client periodically based on periodic location information that indicates when to report the UE location to the client entity. The periodic location information may be a schedule of reporting events and/or a set of triggering events. The schedule may be given in various formats such as, e.g., a start time, a reporting interval, and one of a stop time, a duration, or a particular number of reports. The triggering events may correspond to, e.g., the UE becoming available, the UE entering or leaving predefined geographic areas, the UE being within the predefined geographic areas, the UE velocity or acceleration exceeding predefined thresholds, the UE location, velocity or acceleration changing by predefined thresholds, and so on.

A location estimate for UE 120 may be obtained using a UE-based, UE-assisted, or network-based positioning mode. For the UE-based mode, the location of the UE is determined by the UE, possibly with assistance data from an SMLC, GERAN or UTRAN. For the UE-assisted mode, the location of the UE is determined by the SMLC with assistance (e.g., measurements) from the UE. For the network-based mode, the location of the UE is determined based on information obtained by or already known to the network without any special assistance from the UE. For the network-based mode, the location of the UE may be determined by uplink measurements made at one or more LMUs or base stations.

The UE-based and UE-assisted modes may utilize various positioning methods such as GPS, assisted GPS (A-GPS), hybrid, advanced forward link trilateration (A-FLT), enhanced observed time difference (E-OTD), observed time difference of arrival (OTDOA), and so on. The network-based mode may utilize various positioning methods such as uplink time of arrival (U-TOA), uplink time difference of arrival (U-TDOA), cell-ID, enhanced cell-ID, and so on. Multiple positioning methods for one or more positioning modes may also be employed in combination. The GPS and A-GPS methods derive a location estimate for the UE based solely on satellite measurements and have high accuracy. The hybrid method derives a location estimate based on both satellite and base station measurements and has high accuracy and high reliability. The A-FLT, E-OTD, and OTDOA methods derive a location estimate based on measurements of base station timing made by the UE and have more intermediate accuracy. The U-TOA and U-TDOA methods derive a location estimate based on measurements of UE timing made by the network and have more intermediate accuracy. The cell-ID and enhanced cell-ID methods derive a location estimate based on a cellular network and have coarser accuracy. These various positioning methods are known in the art.

Various message flows to support periodic reporting of the UE location to LCS client 170 are described below for 3GPP-based network 100 in FIG. 1A. These message flows allow the core network (e.g., MSC/SGSN 140) to invoke and utilize the periodic LCS capabilities of RAN 130 to efficiently provide RAN-based periodic location reporting. RAN-based periodic location reporting refers to periodic location reporting that is coordinated and controlled by the RAN, as opposed to the MSC/SGSN, the UE, or the GMLC.

Figure 2A:
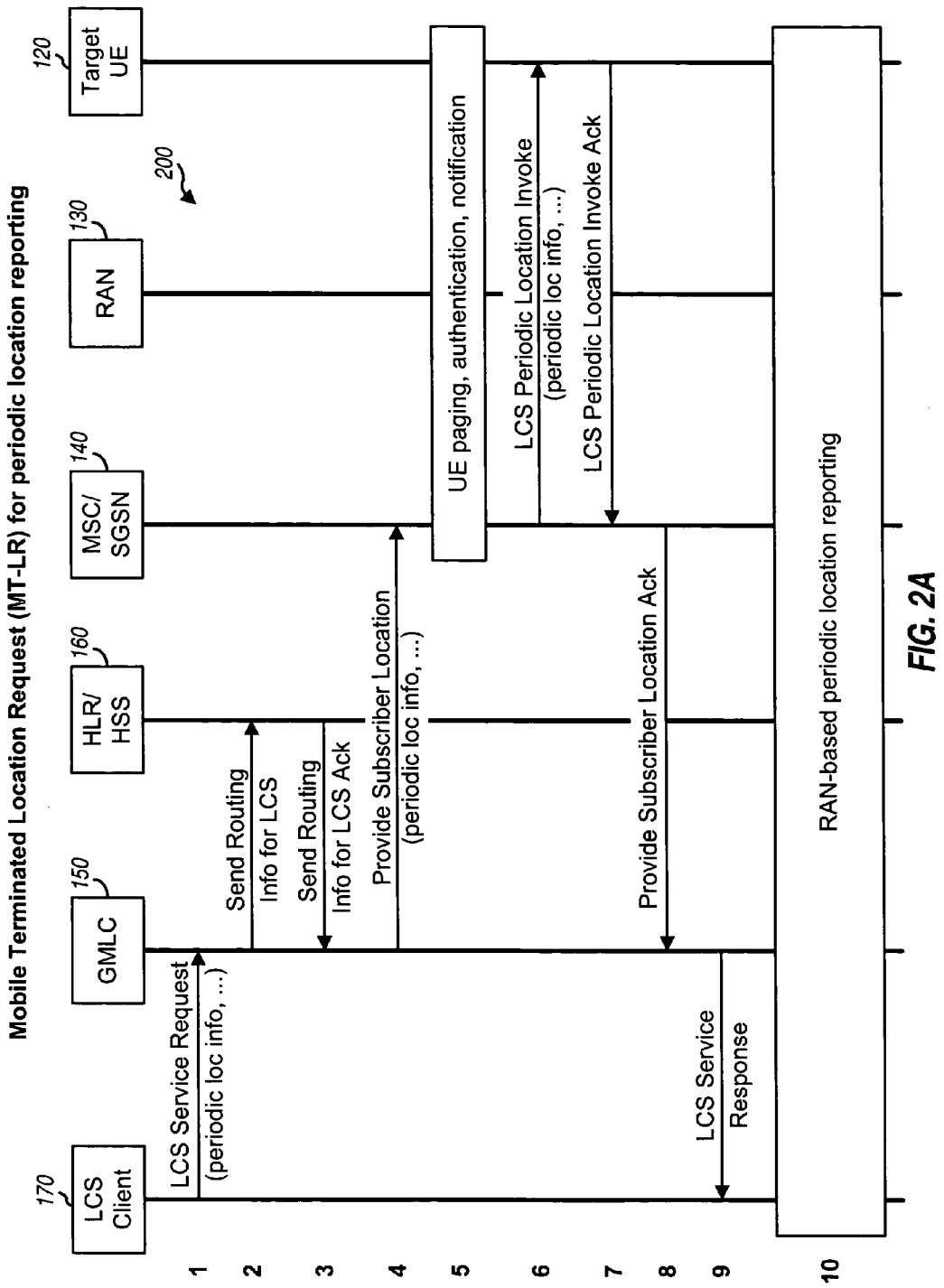
FIG. 2A shows a message flow for MT-LR periodic location reporting.

FIG. 2A shows an embodiment of a message flow 200 for MT-LR periodic location reporting. For message flow 200, LCS client 170 sends to GMLC 150 an LCS Service Request message that contains (1) a request for periodic location reporting of target UE 120 to LCS client 170 (i.e., a periodic location request) and (2) periodic location information ("periodic loc info") (step 1). GMLC 150 may verify the identity of LCS client 170, may authenticate the LCS client, and may determine whether the LCS client is authorized for the requested location service. If LCS client 170 is authorized, then GMLC 150 (1) determines an identifier of UE 120 and LCS quality of service (QoS) based on subscription data for LCS client 170, subscription data for the subscriber of UE 120, and/or data supplied by LCS client 170, (2) performs a privacy check based on a privacy profile for the UE subscriber, and (3) assigns a reference identifier (ID) that is used to associate subsequent location reports with the original periodic location request. For the privacy check, GMLC 150 verifies if LCS client 170 or this type of LCS client is allowed to request periodic location reporting for UE 120 and whether the UE may need to be notified of this request and allowed to accept or reject the request.

If GMLC 150 does not know the current serving MSC or SGSN for UE 120, then GMLC 150 sends a Send Routing Info for LCS message to HLR/HSS 160 to request routing information for the UE (step 2). HLR/HSS 160 then returns a Send Routing Info for LCS Acknowledgment message that contains the address of MSC/SGSN 140 (step 3). Steps 2 and 3 may be skipped if GMLC 150 already knows the address of MSC/SGSN 140. GMLC 150 then sends to MSC/SGSN 140 a Provide Subscriber Location message that contains the periodic location request, the UE identifier, the periodic location information, and/or other relevant information (step 4).

MSC/SGSN 140 may authenticate that the periodic location request is allowed (also step 4). If the periodic location request is allowed, then MSC/SGSN 140 may invoke RAN 130 to perform paging and authentication of UE 120, for example, if UE 120 was in idle mode (step 5). If notification or privacy verification is needed, then MSC/SGSN 140 notifies UE 120 in order to notify the wireless user of the periodic location request and to query the user to grant or deny permission (also step 5). UE 120 may provide its capabilities to RAN 130 and/or MSC/SGSN 140, e.g., whether the UE-based and/or UE-assisted modes are supported by the UE (also step 5). MSC/SGSN 140 then sends to UE 120 an LCS Periodic Location Invoke message that contains pertinent information for the periodic location request (e.g., the periodic location information, the LCS QoS, the reference ID, and so on) (step 6). The LCS Periodic Location Invoke message may also include (1) a list of PLMNs in which periodic location reporting is allowed (e.g., MO-LR requests may be originated) and (2) an indication for each PLMN as to whether the PLMN supports RAN-based periodic location reporting. If no list of PLMNs is included, then subsequent MO-LR requests may be restricted to the current serving PLMN.

UE 120 then sends to MSC/SGSN 140 an LCS Periodic Location Invoke Acknowledgment message that indicates whether or not the periodic location request is accepted and can be actively supported by subsequent MO-LR requests. The result of the privacy verification would not be needed in this message, since it is already included in step 5. If the periodic location request is not accepted but any privacy verification in step 5 passes, then UE 120 would be indicating a willingness to allow periodic location reporting but an inability or unwillingness to actively support it by subsequent MO-LR requests. In that case, MSC/SGSN 140 may still invoke periodic location reporting via RAN 130, as described below. Otherwise, an error response is originated by MSC/SGSN 140 and returned to GMLC 150. In any case, MSC/SGSN 140 sends to GMLC 150 a Provide Subscriber Location Acknowledgment message that indicates whether the periodic location request is accepted (step 8). This message may contain other relevant information such as the list of PLMNs sent to UE 120. GMLC 150 then sends to LCS client 170 an LCS Service Response message that contains the relevant information (e.g., whether the periodic location request is accepted) (step 9). Periodic reporting of the UE location to LCS client 170 is thereafter performed using the periodic LCS capabilities of RAN 130, as described below (step 10).

Figure 2B:
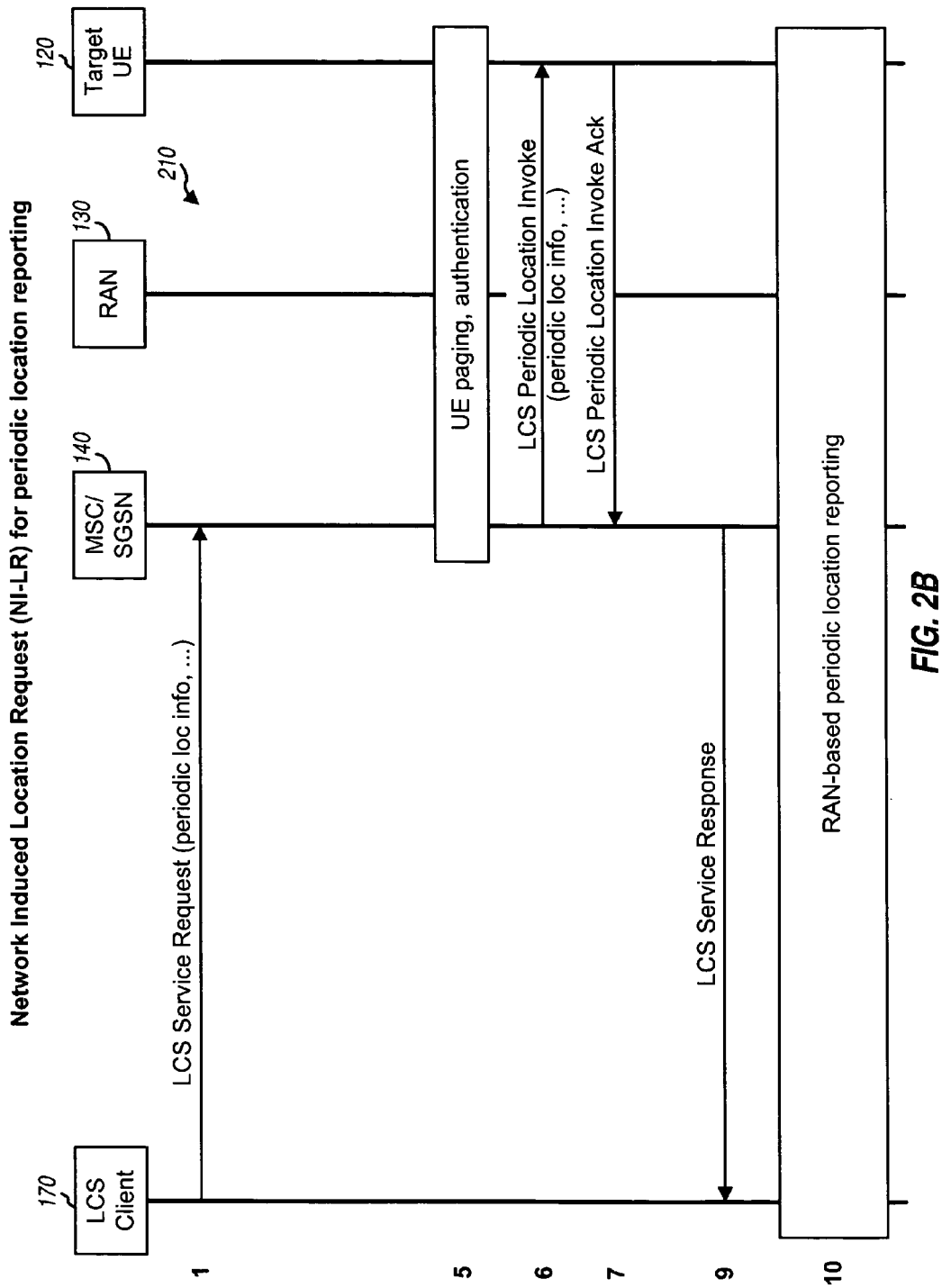
FIG. 2B shows a message flow for NI-LR periodic location reporting.

FIG. 2B shows an embodiment of a message flow 210 for NI-LR periodic location reporting. Message flow 210 may be used if LCS client 170 either resides within MSC/SGSN 140 or resides within the same PLMN and is directly linked to MSC/SGSN 140. Steps 1, 5, 6, 7, 9 and 10 of message flow 210 correspond to steps 1, 5, 6, 7, 9 and 10, respectively, of message flow 200 in FIG. 2A. For message flow 210, LCS client 170 sends directly to MSC/SGSN 140 an LCS Service Request message that contains a periodic location request and periodic location information (step 1). MSC/SGSN 140 may authenticate that the periodic location request is allowed and, if the request is allowed, may invoke RAN 130 to perform paging and authentication of UE 120 (step 5). Typically, no notification or privacy verification is performed in step 5. Steps 6 and 7 of message flow 210 are as described above for message flow 200. MSC/SGSN 140 then sends directly to LCS client 170 an LCS Service Response message that indicates whether the periodic location request is accepted (step 9). Periodic reporting of the UE location to LCS client 170 is thereafter performed using the periodic LCS capabilities of RAN 130, as described below (step 10).

Figure 3:
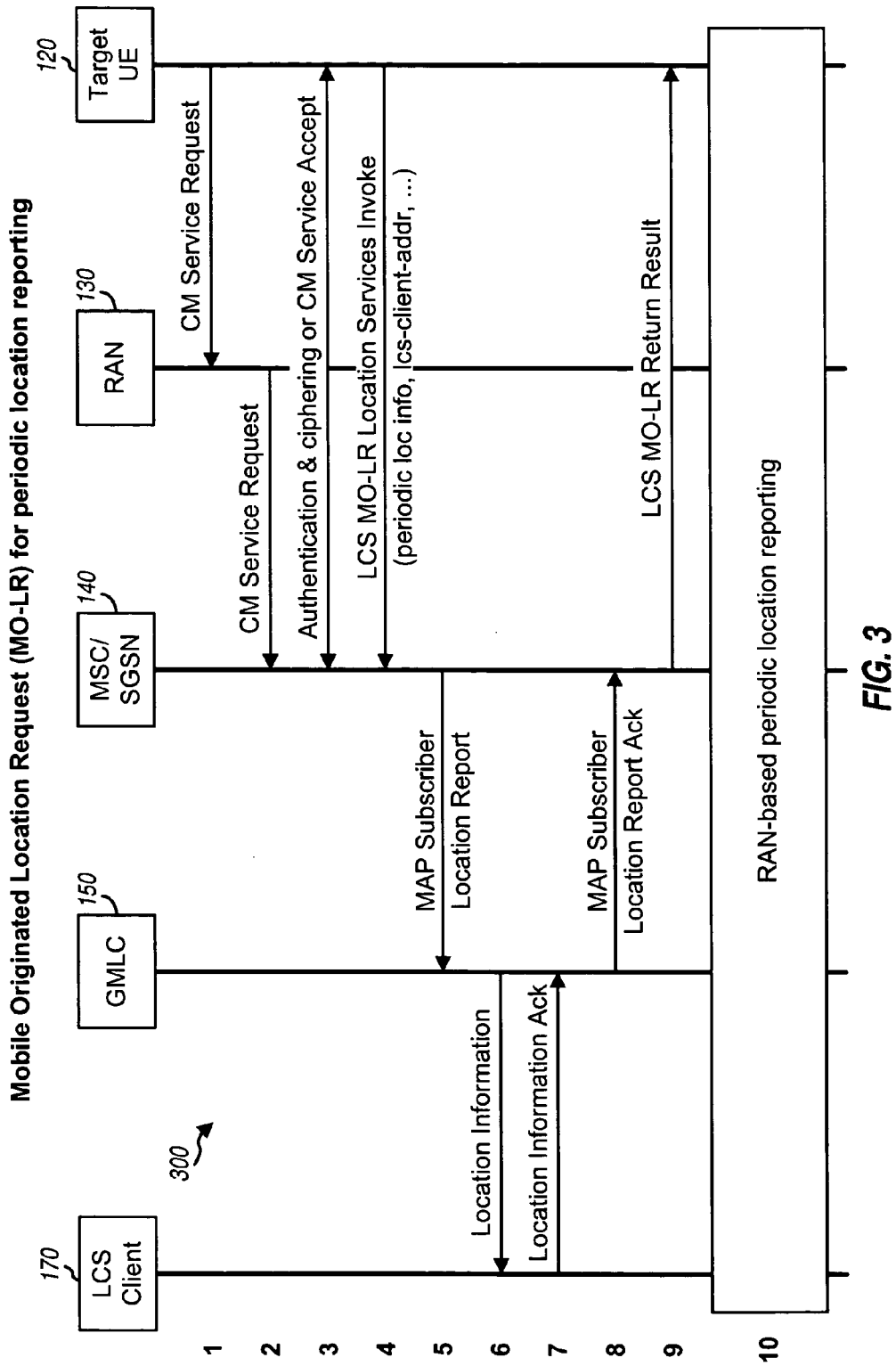
FIG. 3 shows a message flow for MO-LR periodic location reporting.

FIG. 3 shows an embodiment of a message flow 300 for MO-LR periodic location reporting. If UE 120 is in an idle mode, then the UE requests a radio connection setup and sends to RAN 130 a Connection Management (CM) Service Request message indicating a request for a call independent supplementary service (step 1). If UE 120 is in a dedicated mode, then the UE sends a CM Service Request on the already established radio connection (also step 1). RAN 130 forwards the CM Service Request message to MSC/SGSN 140 (step 2). MSC/SGSN 140 instigates authentication and ciphering if UE 120 is in the idle mode or returns a Direct Transfer CM Service Accept message if UE 120 is in the dedicated mode (step 3). UE 120 may provide its capabilities to RAN 130 and/or MSC/SGSN 140, e.g., whether the UE-based and/or UE-assisted modes are supported by the UE (also step 3). For clarity, the connection set-up steps 1 through 3 in FIG. 3 assume a circuit switched (CS) domain, and signaling is sent to an MSC (and not an SGSN). The connection set-up steps for a packet switched (PS) domain are different, and signaling is sent to an SGSN via RAN 130. Connection set-up for CS and PS domains are described in 3GPP TS 23.271, which is publicly available.

UE 120 then sends to MSC/SGSN 140 an LCS MO-LR Location Services Invoke message that contains (1) a request for periodic location reporting of UE 120 to LCS client 170 (i.e., a periodic location request) and (2) pertinent information for the periodic location reporting (step 4). The pertinent information may include any combination of the following:

1. a schedule for location reporting ("periodic loc info"),
2. specific events used to trigger location reporting to LCS client 170 (also "periodic loc info"),
3. the identity of LCS client 170 ("lcs-client-addr"),
4. the identity of GMLC 150 through which LCS client 170 can be accessed,
5. the LCS QoS, e.g., accuracy and response time,
6. a preferred method for periodic location reporting, e.g., MT-LR or MO-LR,
7. the maximum allowed age of any location estimate,
8. whether UE 120 should be identified to LCS client 170 using the real identity or real address of the UE or using a pseudonym, and
9. other relevant information.

MSC/SGSN 140 verifies that UE 120 is authorized for the requested location service based on a subscription profile for the UE (also step 4). If the periodic location request is authorized, then MSC/SGSN 140 sends to GMLC 150 a MAP Subscriber Location Report message that contains the periodic location request and the pertinent information (e.g., the periodic location information) (step 5). GMLC 150 then forwards the periodic location request and the pertinent information to LCS client 170 (step 6). LCS client 170 sends a response for the UE request to GMLC 150 (step 7). In an embodiment, any entity among MSC/SGSN 140, GMLC 150, and LCS client 170 can refuse or accept the periodic location request. If the request is accepted (e.g., not refused by any entity), then GMLC 150 assigns a reference ID for the request. GMLC 150 then sends a MAP Subscriber Location Report Acknowledgment message to MSC/SGSN 140 (step 8). MSC/SGSN 140 may receive any combination of the following information:

1. the reference ID assigned by GMLC 150,
2. a modified schedule for location reporting ("periodic loc info"),
3. modified specific events used to trigger location reporting to LCS client 170 (also "periodic loc info"),
4. the address of GMLC 150, and
5. other relevant information.

MSC/SGSN 140 sends to UE 120 an LCS MO-LR Return Result message that contains the information received from GMLC 150 (step 9). The LCS MO-LR Return Result message may further include (1) a list of PLMNs in which periodic location reporting is allowed and (2) an indication for each PLMN as to whether the PLMN supports RAN-based periodic location reporting. This applies if UE 120 will play an active role in subsequent periodic location reporting via MO-LR requests. If no list of PLMNs is provided, then any subsequent MO-LR requests may be restricted to the current serving PLMN. Periodic reporting of the UE location to LCS client 170 may thereafter be performed using the periodic LCS capabilities of RAN 130, as described below (step 10).

In general, any entity (e.g., UE 120) may invoke RAN-based periodic location reporting of the UE location to LCS client 170. To support invocation by UE 120 of periodic reporting in RAN 130, UE 120 may be informed whether each PLMN has periodic LCS capabilities in the RAN. This information may be included in the list of PLMNs sent to UE 120 in step 6 of message flow 200 or step 9 of message flow 300. This information may also be broadcast by the RANs.

For periodic location reporting, the first location reporting is typically immediately after completing the message exchange to initiate the periodic location reporting. The location reporting may continue until one of the following events occur:

1. the reporting duration has elapsed or the total number of reports has been attained,
2. periodic location reporting is cancelled by LCS client 170 or GMLC 150, or
3. UE 120 terminates the periodic location reporting.

Figure 4:
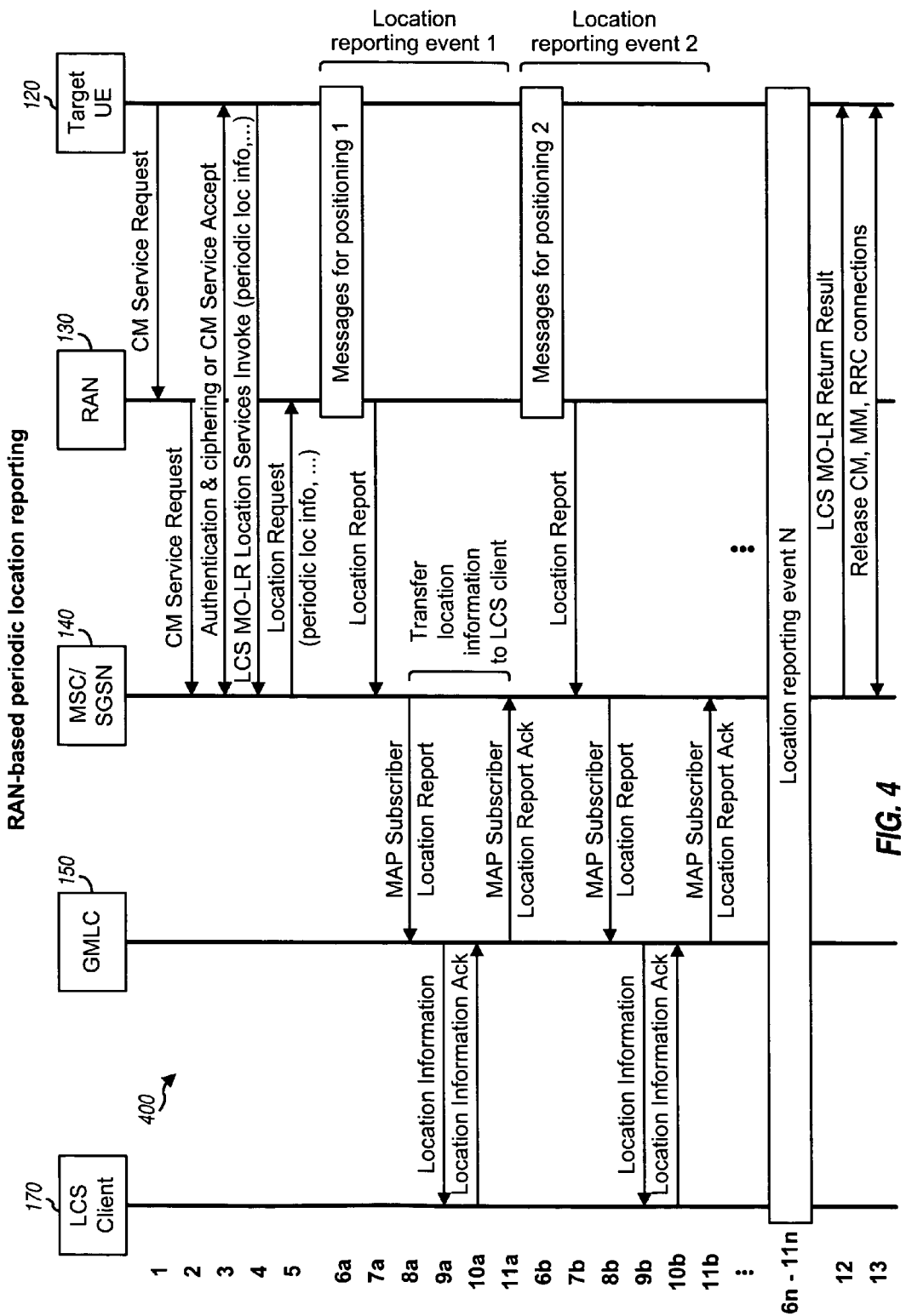
FIG. 4 shows a message flow for RAN-based periodic location reporting.

FIG. 4 shows an embodiment of a message flow 400 for RAN-based periodic location reporting, which may be used for step 10 of message flow 200 in FIG. 2A, step 10 of message flow 210 in FIG. 2B, and step 10 of message flow 300 in FIG. 3. Steps 1 through 3 of message flow 400 are the same as steps 1 through 3 of message flow 300. UE 120 then sends to MSC/SGSN 140 an LCS MO-LR Location Services Invoke message to invoke periodic location reporting (step 4). The LCS MO-LR Location Services Invoke message sent in step 4 of message flow 300 "requests" for periodic location reporting whereas the LCS MO-LR Location Services Invoke message sent in step 4 of message flow 400 "invokes" periodic location reporting after the periodic location request has been authorized. The LCS MO-LR Location Services Invoke message sent in message flow 400 contains pertinent information such as, e.g., the periodic location information, the LCS QoS, the identity of LCS client 170, an indication that the periodic location request has been authorized, and so on. The authorization indication may be, e.g., the reference ID assigned by GMLC 150. The presence (in FIG. 4) or absence (in FIG. 3) of the authorization indication in the LCS MO-LR Location Services Invoke message informs MSC/SGSN 140 whether to execute message flow 400 or message flow 300, respectively. The presence of periodic location information or other equivalent information in the LCS MO-LR Location Services Invoke informs MSC/SGSN 140 that RAN-based periodic location reporting to LCS Client 170 is requested rather than a one shot location report. In the event of a one shot location report, UE 120 would be responsible for re-issuing the LCS MO-LR Location Services Invoke in step 4 (e.g., repeating steps 1 to 4) for each scheduled or triggered location report to be sent to LCS client 170. With the request for RAN-based periodic location reporting, UE does not need to re-issue another LCS MO-LR Location Services Invoke until the scheduling and/or triggering of location reports by the RAN, as described below, is complete.

MSC/SGSN 140 verifies that UE 120 is authorized for the requested location service and then sends to RAN 130 a Location Request message that initiates the RAN-based periodic location reporting (step 5). This message may also contain the periodic location information, the LCS QoS, and so on. RAN 130 selects an appropriate positioning method based on the location request, the required accuracy, and the UE capabilities.

RAN 130 then initiates an appropriate message flow to obtain and return the first location estimate for UE 120 (step 6a). This message flow may be dependent on various factors such as the UE capabilities (e.g., UE-based or UE-assisted), the selected positioning method (e.g., A-GPS, A-FLT, E-OTD, OTDOA, and so on), whether UE 120, RAN 130, or SAS 132 will compute the location estimate, and so on. Several embodiments of the message flow for step 6a are described below. RAN 130 obtains a location estimate for UE 120 from the message flow in step 6a and sends to MSC/SGSN 140 a Location Report message that contains this location estimate and other relevant information (e.g., the reference ID) (step 7a). MSC/SGSN 140 then sends a MAP Subscriber Location Report message containing the location estimate and relevant information to GMLC 150 (step 8a), which sends the location estimate and relevant information to LCS client 170 (step 9a). LCS client 170 responds by sending a location information acknowledgment to GMLC 150 (step 10a), which sends to MSC/SGSN 140 a MAP Subscriber Location Report Acknowledgment message that indicates whether the location estimate has been successfully sent to LCS client 170 (step 11a).

For each subsequent location reporting event i, for i=b . . . n, as determined by the periodic location information, a message flow is performed to obtain a location estimate for UE 120 (step 6i), and the location estimate is sent to MSC/SGSN 140 (step 7i). MSC/SGSN 140 then transfers the location estimate to LCS client 170 (steps 8i through 11i). After all of the location reporting events are completed, MSC/SGSN 140 sends to UE 120 an LCS MO-LR Return Result message to confirm that the location estimates have been sent to LCS client 170 and to indicate termination of the periodic location reporting (step 12). MSC/SGSN 140 may instigate release of the Connection Management (CM), Mobility Management (MM) or GPRS Mobility Management (GMM), and Radio Resource Control (RR/RRC) connections to UE 120, if the UE was previously idle (step 13). Step 13 may be omitted if UE 120 needs to remain in the dedicated mode to communicate with RAN 130, e.g., to support other ongoing services.

RAN-based periodic location reporting in the case of UMTS (e.g., W-CDMA) may be achieved with an RNC-centric mode and a SAS-centric mode. For the RNC-centric mode, a serving radio network controller (SRNC) within the serving RAN coordinates and controls the periodic location reporting for the UE. For the SAS-centric mode, the SRNC passes control over to the SAS, which coordinates and controls the periodic location reporting. For both the RNC-centric and SAS-centric modes, the SRNC stores state information to facilitate communication with the UE, the SAS, and the MSC/SGSN for the periodic location reporting. The UE does not need to be aware of whether the RNC-centric or SAS-centric mode is being used for the periodic location reporting. The RNC-centric and SAS-centric modes may be used for the UE-assisted, UE-based, and network-based modes.

Figure 5:
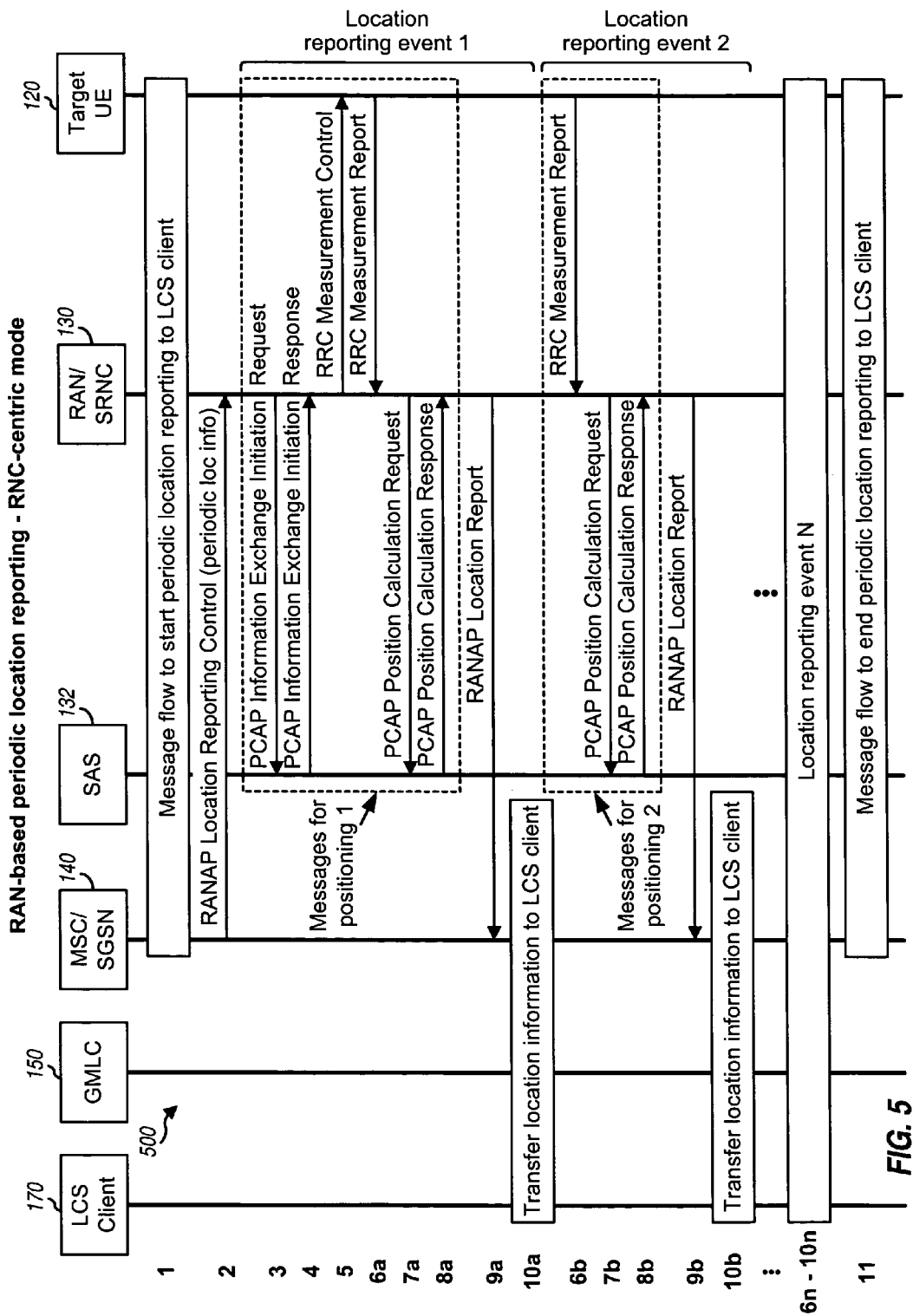
FIGS. 5 and 6 show message flows for RAN-based periodic location reporting in an RNC-centric mode and a SAS-centric mode, respectively.

FIG. 5 shows an embodiment of a message flow 500 for RAN-based periodic location reporting in the RNC-centric mode. Message flow 500 is one embodiment of message flow 400 in FIG. 4 and may be used for step 10 of message flows 200, 210 and 300 in FIGS. 2A, 2B and 3, respectively.

A message flow (which may include steps 1 through 4 of message flow 400 in FIG. 4) is initially performed to start the periodic location reporting to LCS client 170 (step 1). MSC/SGSN 140 then sends to the SRNC within RAN 130 (or simply, RAN/SRNC 130) a Radio Access Network Application Part (RANAP) Location Reporting Control message that initiates the periodic location reporting (step 2). This message may also contain the periodic location information, the LCS QoS, and so on. In an embodiment, the RANAP Location Reporting Control message includes a Periodical Reporting Criteria information element (IE) having the following fields:
1. Amount of Reports—1, 2, 4, 8, 16, 32, 64, infinite, and
2. Reporting Interval—250, 500, 1000, 2000, 3000, 4000, 6000, 8000, 12000, 16000, 20000, 24000, 28000, 32000, 64000 milliseconds (ms).

For this embodiment, each field is associated with a set of possible values given above. In general, the Periodical Reporting Criteria IE may include any field, and each field may include any set of possible values.

The fields for the Periodical Reporting Criteria IE may be defined to be the same as the fields for an RRC Periodical Reporting Criteria IE in an RRC Measurement Control message to be sent by RAN/SRNC 130 to UE 120 in step 5 of message flow 500. Furthermore, the same set of values may be used for the corresponding fields in the Periodical Reporting Criteria IE and the RRC Periodical Reporting Criteria IE. This would then allow RAN/SRNC 130 to simply extract the values in the Periodical Reporting Criteria IE received from MSC/SGSN 140 and to map these values directly onto the RRC Periodical Reporting Criteria IE sent to UE 120. MSC/SGSN 140 would convert the periodic location information (e.g., the start time, stop time, and reporting interval) into the best fitting values for the Amount of Reports and the Reporting Interval fields in the Periodical Reporting Criteria IE. MSC/SGSN 140 may use "infinite" as a default value for the Amount of Reports field and may send a "stop reporting" command to RAN/SRNC 130 when no more location reports are needed. RAN/SRNC 130 would then send the stop command to UE 120. In general, if the pertinent fields in the various messages are not the same, then MSC/SGSN 140 converts the periodic location information received from UE 120 (or received from any other entity in the PLMN such as, e.g., MSC/SGSN 140 or LCS client 170) into the best fitting values for the RANAP Location Reporting Control message in step 2 (if needed), and RAN/SRNC 130 converts these values into the best fitting values for the RRC Measurement Control message in step 5 (if needed).

In another embodiment, the Periodical Reporting Criteria EE in the RANAP Location Reporting Control message may include any value for the reporting interval (e.g., any integer multiple of seconds) or any value for the number of reports. RAN/SRNC 130 or SAS 132 may use this information to decide whether to invoke RRC periodical reporting or to periodically repeat the RRC Measurement Control/Measurement Report message sequence as used for a single request. For example, RRC periodical reporting may be invoked when the values for the Periodical Reporting Criteria IE in the received RANAP Location Reporting Control are compatible with the corresponding values in the RRC Periodical Reporting Criteria IE.

RAN/SRNC 130 selects an appropriate positioning method based on the location request, the required accuracy, and the UE capabilities (also step 2). If SAS 132 is available and the selected positioning method is A-GPS, then RAN/SRNC 130 may send to SAS 132 a Positioning Calculation Application Part (PCAP) Information Exchange Initiation Request message to request for GPS assistance data (step 3). SAS 132 then returns to RAN/SRNC 130 a PCAP Information Exchange Initiation Response message that contains the requested GPS assistance data (step 4). Steps 3 and 4 may be omitted for other positioning methods or if GPS assistance data is not needed or if RAN/SRNC already possesses GPS assistance data (e.g., from a previous request to SAS 132). RAN/SRNC 130 then sends to UE 120 an RRC Measurement Control message that contains the periodic location information (e.g., the RRC Periodical Reporting Criteria IE) and the GPS assistance data (step 5). Steps 3, 4 and 5 are part of the messages for positioning 1 for the first location reporting event.

For each location reporting event i, for i=a . . . n, as determined by the periodic location information, UE 120 sends to RAN/SRNC 130 an RRC Measurement Report message that contains location information (step 6i). This location information may comprise measurements made by UE 120 for base stations and/or satellites observable by the UE (for the UE-assisted mode), a location estimate for UE 120 (for the UE-based mode), or an error indication if no measurements or location estimate are available. The measurements may be, e.g., pseudo-ranges for A-GPS, system frame number-system frame number (SFN-SFN) observed time differences for OTDOA, or some other type of measurements. If the reporting interval is short (e.g., 2 seconds) and the selected positioning method is A-GPS, then the first few RRC Measurement Report messages may contain error messages until a GPS receiver at UE 120 has acquired the satellites and is in a tracking mode. After that, the RRC Measurement Report messages should provide good measurements and/or location estimates at the reporting interval.

If RAN/SRNC 130 receives measurements from UE 120 (for the UE-assisted mode) and SAS 132 is available, then RAN/SRNC 130 sends to SAS 132 a PCAP Position Calculation Request message that contains the UE measurements and possibly other information, e.g., for additional network-based positioning (step 7i). The PCAP Position Calculation Request message sent at steps 7i may also contain periodic location information, e.g., reporting interval and number of outstanding requests for the overall periodic location procedure. The periodic location information allows SAS 132 to maintain state information between individual PCAP Position Calculation Requests to better fulfill future such requests. SAS 132 computes a location estimate for UE 120 based on the measurements and any other information and sends to RAN/SRNC 130 a PCAP Position Calculation Response message that contains the location estimate (step 8i). If RAN/SRNC 130 receives a location estimate from UE 120 (for the UE-based mode), then steps 7i and 8i may be skipped. If RAN/SRNC 130 decides to use only network-based positioning (e.g., enhanced cell ID, U-TDOA) then steps 3, 4, 5 and 6i (for i=a . . . n) are skipped and RAN/SRNC 130 sends to SAS 132 in step 7i a PCAP Position Calculation Request message containing information for the chosen network-based position methods. SAS 132 then returns in step 8*i* a PCAP Position Calculation Response message containing a location estimate resulting from the application of the network-based methods by SAS 132. In any case, RAN/SRNC 130 sends a RANAP Location Report message containing the location estimate to MSC/SGSN 140 (step 9*i*), which transfers the location estimate to LCS client 170 (step 10*i*). Step 10*i* may include 8*i* through 11*i* of message flow 400 in FIG. 4.

As shown in FIG. 5, each location reporting event includes messages for positioning, transfer of the location estimate from RAN/SRNC 130 to MSC/SGSN 140 (step 9*i*), and transfer of the location estimate from MSC/SGSN 140 to LCS client 170 (step 10*i*). The messages for positioning 1 for the first location reporting event include 3 through 8*a*, and the messages for positioning i for each subsequent location reporting event include steps 6*i* through 8*i*. The messages for positioning 1 for the first location reporting event may include additional steps 3, 4 and 5 to request and subsequently obtain GPS assistance from SAS 132 (steps 3 and 4), and to transfer this assistance data to UE 120 to invoke UE 120 to periodically send location information (step 5). UE 120 may also request new assistance data in step 6*i*, instead of or in addition to sending location measurements to RAN/SRNC 130. This may be the case, for example, if the number of reports initially requested (e.g., in step 5) is large and the positioning method requested is A-GPS. If UE 120 requests new assistance data, then steps 3, 4 and 5 are repeated and new or updated assistance data is sent to UE 120 in a Measurement Control message or in an Assistance Data Delivery message, together with other relevant information. The request for new assistance data in step 6*i* and its provision through a repetition of steps 3, 4 and 5 may occur more than once in message flow 500. After all of the location reporting events are completed, a message flow (which may include steps 12 and 13 of message flow 400 in FIG. 4) is performed to end the periodic location reporting to LCS client 170 (step 11).

RAN/SRNC 130 may decide at step 5 not to request periodic UE reporting, e.g., to omit the RRC Periodical Reporting Criteria IE from the RRC Measurement Control message, or to include this IE with a value of one for the number of reports. As mentioned above, this may be the case if the periodic location information received in the RANAP Location Reporting Control message is not compatible with the corresponding available value range in the RRC Measurement Control message. RAN/SRNC 130 may then repeat sending step 5 at the desired periodic reporting interval. The messages for positioning i for each location reporting event would then include step 5 in addition to steps 6*i* through 8*i*.

Figure 6:
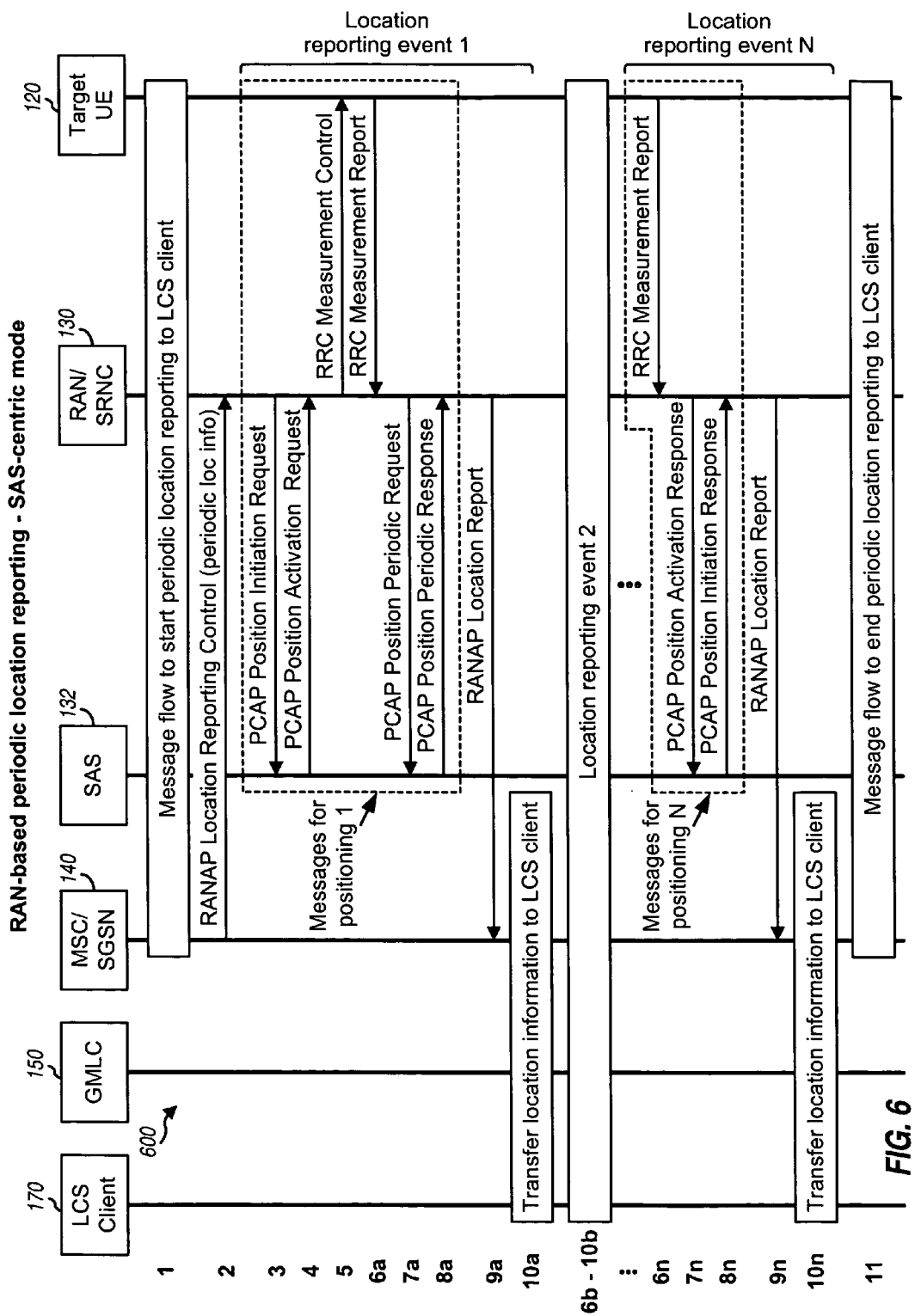

FIG. 6 shows an embodiment of a message flow 600 for RAN-based periodic location reporting in the SAS-centric mode. Message flow 600 is another embodiment of message flow 400 in FIG. 4 and may also be used for step 10 of message flows 200, 210 and 300 in FIGS. 2A, 2B and 3, respectively.

Steps 1 and 2 of message flow 600 are similar to (e.g., the same as) steps 1 and 2 of message flow 500 in FIG. 5. RAN/SRNC 130 receives from MSC/SGSN 140 a RANAP Location Reporting Control message that contains the periodic location information, the LCS QoS, and so on (step 2). RAN/SRNC 130 then sends to SAS 132 a PCAP Position Initiation Request message that contains the information received from MSC/SGSN 140 and possibly other information such as cell ID and UE positioning capabilities (e.g., information on positioning method or methods that the target UE 120 supports) (step 3). This message also transfers control of the periodic location reporting to SAS 132. SAS 132 selects a suitable positioning method based on the required accuracy and the UE capabilities and determines appropriate assistance data (if any) to send to UE 120. SAS 132 then sends to RAN/SRNC 130 a PCAP Position Activation Request message that contains the periodic location information (e.g., the Periodical Reporting Criteria IE) and assistance data (step 4). SAS 132 may convert the periodic location information received from RAN/SRNC 130 in step 3 into the best fitting values for the PCAP Position Activation Request message, if needed, in step 4. RAN/SRNC 130 then sends to UE 120 an RRC Measurement Control message that contains the periodic location information and the assistance data (step 5). Steps 3, 4 and 5 are part of the messages for positioning 1 for the first location reporting event.

For each location reporting event i, for i=a . . . n, as determined by the periodic location information, UE 120 sends to RAN/SRNC 130 an RRC Measurement Report message that contains location information (step 6*i*). This location information may comprise measurements made by UE 120 for base stations and/or satellites (for the UE-assisted mode), a location estimate for UE 120 (for the UE-based mode), or an error indication if no measurements or location estimate are available. RAN/SRNC 130 sends to SAS 132 a PCAP Position Periodic Request message that contains the location information received from UE 120 (step 7*i*). For the UE-assisted mode, SAS 132 receives measurements from UE 120 and computes a location estimate for the UE based on the measurements and possibly other information (e.g., information obtained from network based positioning). For the UE-based mode, SAS 132 receives a location estimate from UE 120 and may verify the location estimate and/or modify it (e.g., based on information obtained from network based positioning). For both the UE-based and UE-assisted modes, SAS 132 sends to RAN/SRNC 130 a PCAP Position Periodic Response message that contains the location estimate for UE 120 (step 8*i*). RAN/SRNC 130 then sends a RANAP Location Report message containing the location estimate to MSC/SGSN 140 (step 9*i*), which transfers the location estimate to LCS client 170 (step 10*i*). Step 10*i* may include 8*i* through 11*i* of message flow 400 in FIG. 4.

Following receipt of the final RRC Measurement Report message from UE 120 (step 6*n*), RAN/SRNC 130 may send to SAS 132 in step 7*n* a PCAP Position Activation Response message carrying the same type of information (e.g., measurements or a location estimate) as the PCAP Position Periodic Request message in previous steps 7*i* (for i=a . . . n−1). SAS 132 may then return a PCAP Position Initiation Response message in step 8*n* carrying the same type of information (e.g., a computed location estimate) as the PCAP Position Periodic Response message in previous steps 8*i* (for i=a . . . n−1). This distinction can assist compliance with existing conventions for 3GPP (defined in 3GPP TS 25.453) that any PCAP request message, sent either from an RNC to an SAS or from an SAS to an RNC, be answered by at most one distinct PCAP response message. In this case, the PCAP Position Initiation Response message sent in step 8*n* is the response to the PCAP Position Initiation Request message sent in step 3; the PCAP Position Activation Response message sent in step 7*n* is the response to the PCAP Position Activation Request message sent in step 4; and the PCAP Position Periodic Response message sent in step 8*i* (for i=a . . . n−1) is the response to the PCAP Position Periodic Request message sent in step 7*i*. These pairings comply specifically with the class 1 elementary procedure in 3GPP TS 25.453. Furthermore, the first two pairings (steps 3 and 8*n*, and steps 4 and 7*n*) are applicable to single shot location requests (e.g., since each pairing occurs once only) enabling greater compatibility between single shot and periodic location requests and possibly easier implementation in RAN/SRNC 130 and SAS 132 to support both types of location requests. To enable greater compatibility with RNC-centric operation, the PCAP Position Periodic Request and Response messages in steps 7i and 8i may be replaced by PCAP Position Calculation Request/Response messages used in RNC-centric mode and shown in FIG. 5. In that case, the PCAP Position Calculation Request/Response messages may be slightly modified to also enable delivery of a location estimate received from the UE to the SAS, but no new procedures are needed.

In an alternative embodiment of message flow 600, following receipt of the final RRC Measurement Report message from UE 120 in step 6n, RAN/SRNC may send a PCAP Position Periodic Request message to SAS 132 in step 7n, and SAS 132 may return a PCAP Position Periodic Response message in step 8n just as in the previous steps 7i and 8i. In this case, following step 8n and not shown in FIG. 6, RAN/SRNC 130 may send to SAS 132 a PCAP Position Activation Response message that does not contain any measurements or location estimate, and SAS 132 may return a PCAP Position Initiation Response message that does not contain a location estimate, in order to reply to the earlier messages in steps 3 and 4 and end the transactions associated with them in SAS 132 and RAN/SRNC 130.

In another alternative embodiment of message flow 600, the PCAP class 1 elementary procedures comprising PCAP Position Periodic Request and Response messages in steps 7i and 8i may be replaced by PCAP class 2 elementary procedures, which are defined in 3GPP TS 25.453. Class 2 elementary procedures are procedures without a response message. In this embodiment, the PCAP Position Activation Response message at step 7n of message flow 600 may be sent either immediately after the PCAP Position Activation Request message at step 4, or after the first RRC Measurement Report message has been received, which is after step 6a. In the former case, the PCAP Position Activation Response message would contain a confirmation of the requested action. In the later case, the PCAP Position Activation Response message would additionally contain the first measurement report information. The PCAP Position Activation Request message may contain certain recommended positioning instructions that RAN/SRNC 130 may to forward to UE 120 in a RRC Measurement Control message at step 5. If RAN/SRNC 130 cannot comply with the request for certain positioning instructions, then RAN/SRNC 130 may inform SAS 132 in a PCAP Position Activation Response message about the positioning instructions used instead in the RRC Measurement Control message send to UE 120 in step 5. An example of such positioning instructions may be information about in which RRC state the requested measurements are valid. Subsequent measurement report information received at RAN/SRNC 130 from UE 120 would then be conveyed to SAS 132 in class 2 PCAP Position Periodic Report messages, which would be sent in steps 7i in place of the PCAP Position Periodic Request messages shown in message flow 600. SAS 132 would in turn report the location estimates in class 2 PCAP Position Periodic Result messages to RAN/SRNC 132, which would be sent in steps 8i in place of the PCAP Position Periodic Response messages shown in message flow 600. If SAS 132 decides to cancel an ongoing RRC periodic procedure, then SAS 132 may send to RAN/SRNC 132 a PCAP Position Periodic Result message containing a request for termination of the periodic procedure. Alternatively, SAS 132 may send a class 2 PCAP Position Periodic Termination message to RAN/SRNC 130 to cancel an ongoing periodic procedure. This message flow may be more compatible with periodic location procedures that do not require RRC signaling, e.g., Cell-ID or U-TDOA network based positioning.

The class 2 embodiment described above allows SAS 132 to decide whether to invoke periodic RRC measurement reporting or to periodically repeat single requests (e.g., in case the periodic reporting information received at SAS 132 in a PCAP Position Initiation Request message at step 3 is not compatible with the available value range in the RRC Periodical Reporting Criteria IE). SAS 132 may then repeat sending the PCAP Position Activation Request message to RAN/SRNC 132 at the requested periodic reporting interval. RAN/SRNC 130 would repeat the RRC Measurement Control/Report message pair and conveys the measurement information to SAS 132 in a PCAP Position Activation Response message. SAS 132 may then send the individual location estimates to RAN/SRNC 130 in PCAP Position Periodic Result messages.

The class 2 embodiment may be used, for example, to support periodic cell-ID based positioning. In this case, SAS 132 may periodically send a PCAP Position Activation Request message to RAN/SRNC 130 (not shown in FIG. 6). RAN/SRNC 130 may then return a PCAP Position Activation Response message containing cell related measurements for UE 120 obtained by RAN/SRNC 130. SAS 132 may then send to RAN/SRNC 130 a PCAP Position Periodic Result message containing a location estimate obtained from these measurements.

The class 2 embodiment may also used to support periodic U-TDOA based positioning. In this case, RAN/SRNC 130 may return to SAS 132 a PCAP Position Activation Response message containing channel related information for UE 120 after receiving a PCAP Position Activation Request message in step 3 in FIG. 6. SAS 132 may then configure LMUs to obtain periodic U-TDOA measurements for UE 120 and may return the periodic location estimate results to RAN/SRNC 130 in a series of PCAP Position Periodic Result messages. In this embodiment for U-TDOA, it may not be necessary for RAN/SRNC 130 to send further messages to SAS 132, thereby conserving transmission and processing resources and reducing delay.

The class 2 embodiment may be extended to support periodic U-TDOA based positioning in parallel with periodic A-GPS and/or periodic OTDOA positioning. In this case, periodic U-TDOA positioning may be instigated as described above. Periodic A-GPS or OTDOA positioning may then be instigated using the class 2 elementary PCAP procedure embodiment also described above. SAS 132 may obtain periodic location estimates for UE 120 using periodic U-TDOA measurements obtained by LMUs and periodic GPS measurements provided to SAS 132 in periodic PCAP Position Periodic Report messages. SAS 132 may then return each location estimate to RAN/SRNC 130 in a PCAP Position Periodic Result message.

As shown in FIG. 6, each location reporting event includes messages for positioning, transfer of the location estimate from RAN/SRNC 130 to MSC/SGSN 140 (step 9i), and transfer of the location estimate from MSC/SGSN 140 to LCS client 170 (step 10i). The messages for positioning 1 for the first location reporting event includes steps 3 through 8a, and the messages for positioning i for each subsequent location reporting event includes steps 6i through 8i. After all of the location reporting events are completed, a message flow (which may include steps 12 and 13 of message flow 400 in FIG. 4) is performed to end the periodic location reporting to LCS client 170 (step 11).

UE 120 may at some point request new or updated assistance data in step 6i, instead of or in addition to sending location measurements to RAN/SRNC 130. This may be the case, for example, if the number of reports initially requested (e.g., in step 5) was large and the positioning method requested was A-GPS. In an embodiment, the request for additional assistance data may be transferred from RAN/SRNC 130 to the SAS 132 within either a PCAP Position Periodic Request message or a PCAP Position Periodic Report message (not shown in FIG. 6) sent in step 7i and the requested assistance data may be returned by SAS 132 to RAN/SRNC 130 in either a PCAP Position Periodic Response message or a PCAP Position Periodic Result message (not shown in FIG. 6) sent in step 8i. RAN/SRNC 130 may then transfer the assistance data to UE 120 in either an RRC Measurement Control message or an RRC Assistance Data Delivery message (not shown in FIG. 6). This embodiment avoids the need for SAS 132 and RAN/SRNC 130 to restart A-GPS positioning support. In another embodiment, after receiving the request for additional assistance data in step 6i, RAN/SRNC 130 may transfer this request to SAS 132 in a PCAP Position Activation Response message (not shown in FIG. 6). SAS 132 then prepares the new assistance data requested and sends this together possibly with new periodic location information in a new PCAP Position Activation Request message to RAN/SRNC 130 (not shown in FIG. 6), which starts off a new transaction. RAN/SRNC 130 then sends a new RRC Measurement Control message to UE 120 indicating that the measurement previously instigated (in step 5) is now modified with new assistance data (and possibly new reporting instructions). This embodiment has the effect of restarting A-GPS positioning support in SAS 132 and RAN/SRNC 130 and possibly in changing the periodic reporting instructions in UE 120.

In another embodiment, RAN/SRNC 130 may invoke a PCAP Information Exchange Procedure as defined in 3GPP TS 25.453 to request assistance data from SAS 132, which is currently used for RNC-centric mode only. In this embodiment, RAN/SRNC 130 may request assistance data from SAS 132 by copying steps 3, 4 and 5 in FIG. 5 (not shown in FIG. 6). When using this procedure also in SAS-centric mode, SAS 132 is aware that this procedure belongs to the positioning event for UE 120, e.g., by using a session ID parameter that relates all PCAP messages to the same positioning event, or by using the existing signaling connection allocated for this particular positioning event of UE 120.

In any case, after receiving assistance data, UE 120 continues to report measurements in an RRC Measurement Report message to RAN/SRNC 130, which in turn continues the PCAP Position Periodic Request and PCAP Position Periodic Response message pair, or alternatively, the PCAP Position Periodic Report and PCAP Position Periodic Result messages as described above. The request for new assistance data by UE 120 in step 6i and its provision through one of the embodiments described above may also occur more than once in message flow 600.

Certain exception conditions may arise occasionally during message flow 600 in FIG. 6 that require some additional action. If UE 120 changes serving cell but remains within the coverage of RAN/SRNC 130, RAN/SRNC 130 may notify SAS 132 of the new cell by sending to SAS 132 a PCAP Position Parameter Modification message containing the identity of the new cell. This message may be the same as that currently allowed (e.g., in 3GPP TS 25.305) for intra-RNC cell change with single shot positioning in SAS-centric mode. RAN/SRNC 130 may also send a PCAP Position Parameter Modification message to SAS 132 if there is a RRC state change during an ongoing RRC measurement procedure. In the event of certain other exception conditions, such as hard handover to another RNC, UE 120 and/or RAN/SRNC 130 may abort the periodic location procedure and MSC/SGSN 140 may restart the procedure (e.g., by signaling to a new RAN/SRNC).

The RAN-based periodic location reporting message flows in FIGS. 4, 5 and 6, with some small changes described below, may be used for an MT-LR for periodic location reporting (FIG. 2A) and an NI-LR for periodic location reporting (FIG. 2B), e.g., if UE 120 or MSC/SGSN 140 cannot support or does not agree to support the periodic location procedure via MO-LR requests that FIGS. 4, 5 and 6 currently show or assume. RAN-based periodic location reporting may be used if the UE subscriber does not reject the location request in the case of an MT-LR where notification and privacy verification is used in step 5 of FIG. 2A. The changes to the message flows in FIGS. 4, 5 and 6 are as follows.

In FIG. 4, steps 1 through 4 are removed. Instead, MSC/SGSN 140 performs paging and authentication (e.g., as described for step 5 in FIG. 2A) if UE 120 has gone back to idle mode. However, there should be no notification and privacy verification (shown in step 5 in FIG. 2A) since that would have been done earlier as part of message flow 200 in FIG. 2A or (if needed) message flow 210 in FIG. 2B. If UE 120 is not in the idle mode, then no paging and authentication is needed. Step 12 is also removed, but step 13 remains valid.

In FIGS. 5 and 6, step 1 should now include just paging and authentication, if UE 120 is in idle mode, as described above for the changes to FIG. 4. Step 11 now corresponds to just step 13 (and not both steps 12 and 13) in FIG. 4.

For message flow 400 shown in FIG. 4, a relatively long MO-LR transaction may occur from step 4 through step 12. During this time, UE 120 may have no knowledge of the success or failure of each location transfer, and is informed of the results of the periodic location reporting after completion of the reporting. However, the open MO-LR transaction may be useful to maintain the CM and MM/GMM connection to UE 120 and to prevent UE 120 from returning to the idle mode. It may be desirable to keep UE 120 informed of the progress of the periodic location reporting using LCS update services.

Figure 7:
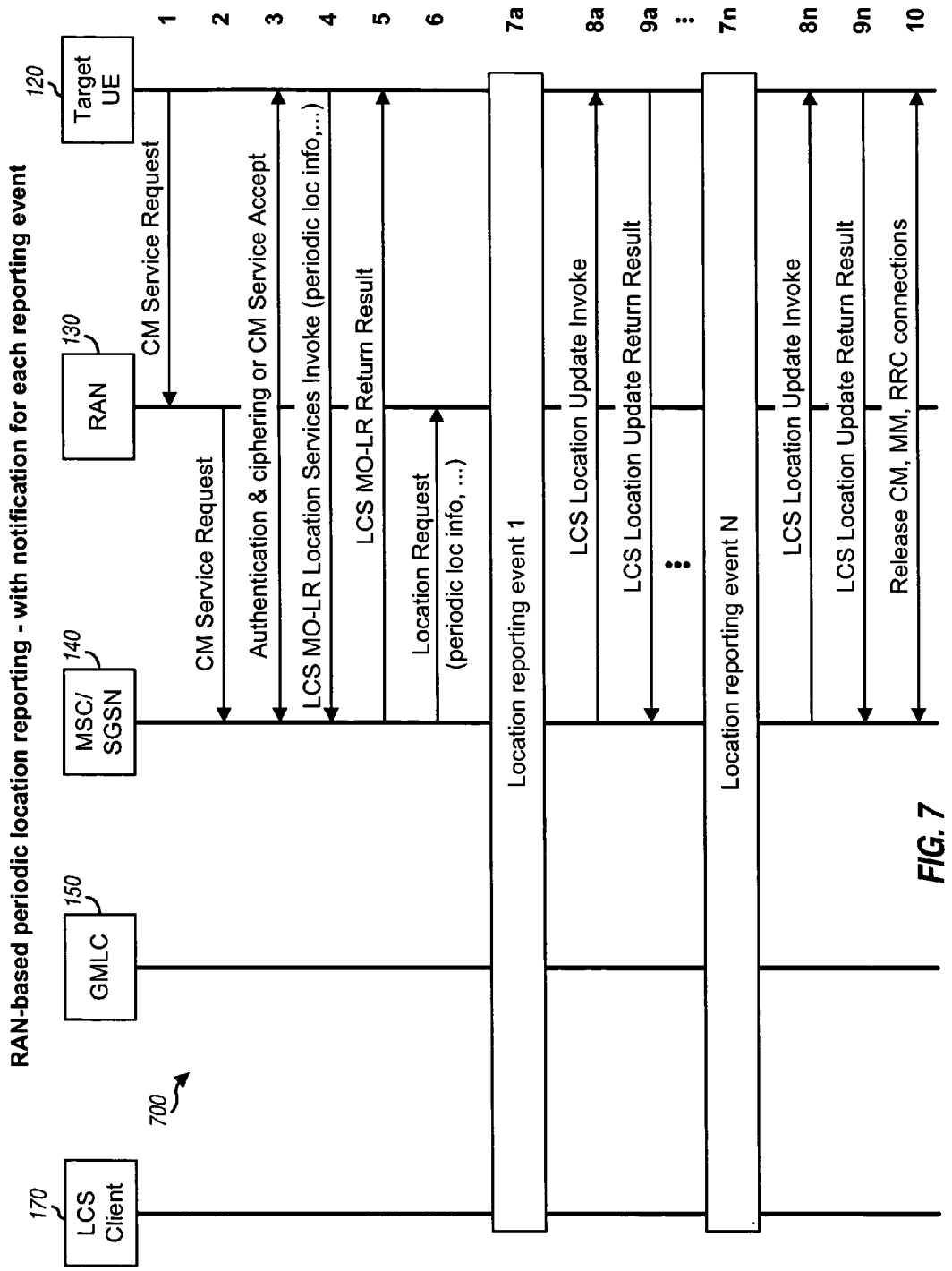
FIG. 7 shows a message flow for RAN-based periodic location reporting with notification.

FIG. 7 shows an embodiment of a message flow 700 for RAN-based periodic location reporting with notification. Message flow 700 may also be used for step 10 of message flows 200, 210 and 300 in FIGS. 2A, 2B and 3, respectively. Steps 1 through 4 of message flow 700 are the same as steps 1 through 4 of message flow 400 in FIG. 4. UE 120 sends to MSC/SGSN 140 an LCS MO-LR Location Services Invoke message to invoke periodic location (step 4). MSC/SGSN 140 sends an LCS MO-LR Return Result message to UE 120 to acknowledge the invocation (step 5) thereby providing immediate feedback to UE 120 that the MO-LR request will be supported. MSC/SGSN 140 also sends to RAN 130 a Location Request message that contains the periodic location information and the LCS QoS (step 6).

A message flow is then performed to obtain the first location estimate for UE 120 and to transfer the location estimate to LCS client 170 (step 7a). Step 7a may include steps 6a through 11a of message flow 400 in FIG. 4, steps 3 through 10a of message flow 500 in FIG. 5, or steps 3 through 10a of message flow 600 in FIG. 6. MSC/SGSN 140 then sends an LCS Location Update Invoke message to UE 120 to indicate that the first location estimate has been successfully transferred to LCS client 170 (step 8a). This message may also serve to notify UE 120 that a second location estimate will be transferred at the next location reporting event, e.g., following the next periodic interval. UE 120 sends an LCS Location Update Return Result message to MSC/SGSN 140 to acknowledge receipt of the notification (step 9*a*). This message may include a denial of the next location reporting if UE 120 desires to cancel the periodic location procedure at this time.

For each subsequent location reporting event i, for i=b . . . n, a message flow is performed to obtain and transfer a location estimate for UE 120 to LCS client 170 (step 7*i*), an LCS Location Update Invoke message is sent by MSC/SGSN 140 to notify UE 120 of the results of the location transfer (step 8*i*), and an LCS Location Update Return Result message is sent by UE 120 to acknowledge the notification (step 9*i*). After all of the location reporting events are completed, MSC/SGSN 140 may instigate release of the CM, MM or GMM, and RR/RRC connections to UE 120 (step 10).

In another embodiment, the LCS MO-LR Return Result message is not sent in step 5 in FIG. 7 and is sent instead after step 9*n*, similar to message flow 400 in FIG. 4. In this case, the sending of the LCS Location Update Invoke messages from MSC/SGSN 140 to UE 120 in steps 8*a* . . . 8*n* in FIG. 7 provides feedback to UE 120 that the MO-LR request will be supported as well as the result of each location transfer to UE 120.

In an alternative embodiment, the LCS Location Update Invoke message in each step 8*i* and the LCS Location Update Return Result message in each step 9*i* are replaced by an LCS Notification Invoke message and an LCS Notification Return Result, respectively, which are existing 3GPP messages defined in 3GPP TS 24.080. The use of existing 3GPP messages may reduce implementation impacts to MSC/SGSN 140 and UE 120.

In yet another embodiment, either a pair of LCS Location Update Invoke message and LCS Location Update Return Result message or a pair of LCS Notification Invoke message and LCS Notification Return Result message is exchanged prior to each location reporting event (not shown in FIG. 7) instead of after the event (as shown in FIG. 7). For this embodiment, the LCS Location Update Invoke message or the LCS Notification Invoke message informs UE 120 that a location estimate will be obtained and transferred to LCS client 170 in the following location reporting event. The UE user may then be given an opportunity to deny the transfer or to cancel the periodic location reporting. The message may also inform UE 120 of the results of the previous transfer (e.g., whether the transfer was successful or unsuccessful, if no location estimate was obtained). In yet another embodiment, either a pair of LCS Location Update Invoke message and LCS Location Update Return Result message or a pair of LCS Notification Invoke message and LCS Notification Return Result message is sent prior to each location reporting event, and a final pair of these messages is sent after the last location reporting event. The message pair prior to each location reporting event conveys to UE 120 the result of the previous location transfer (if any), allows UE 120 to deny the transfer or to cancel the procedure, and informs UE 120 of the next transfer. The message pair after the last location reporting event informs UE 120 of the termination of the periodic location reporting and the results of the location transfers.

It may be desirable for UE 120 to perform periodic self location to periodically determine its own location for its own use or on behalf of some external application (e.g., accessed via the Internet) with which UE 120 is in communication. If UE 120 supports the UE-based mode, then UE 120 can derive location estimates on its own whenever needed, possibly without any signaling with RAN 130. However, if UE 120 only supports the UE-assisted mode or has no positioning capability, then overhead would be incurred to periodically set up and tear down each location transaction in RAN 130 for each MO-LR request for self location if each such request instigates only a single shot location request. This overhead may be reduced or avoided by using the periodic LCS capabilities of RAN 130 for periodic self location.

Figure 8:
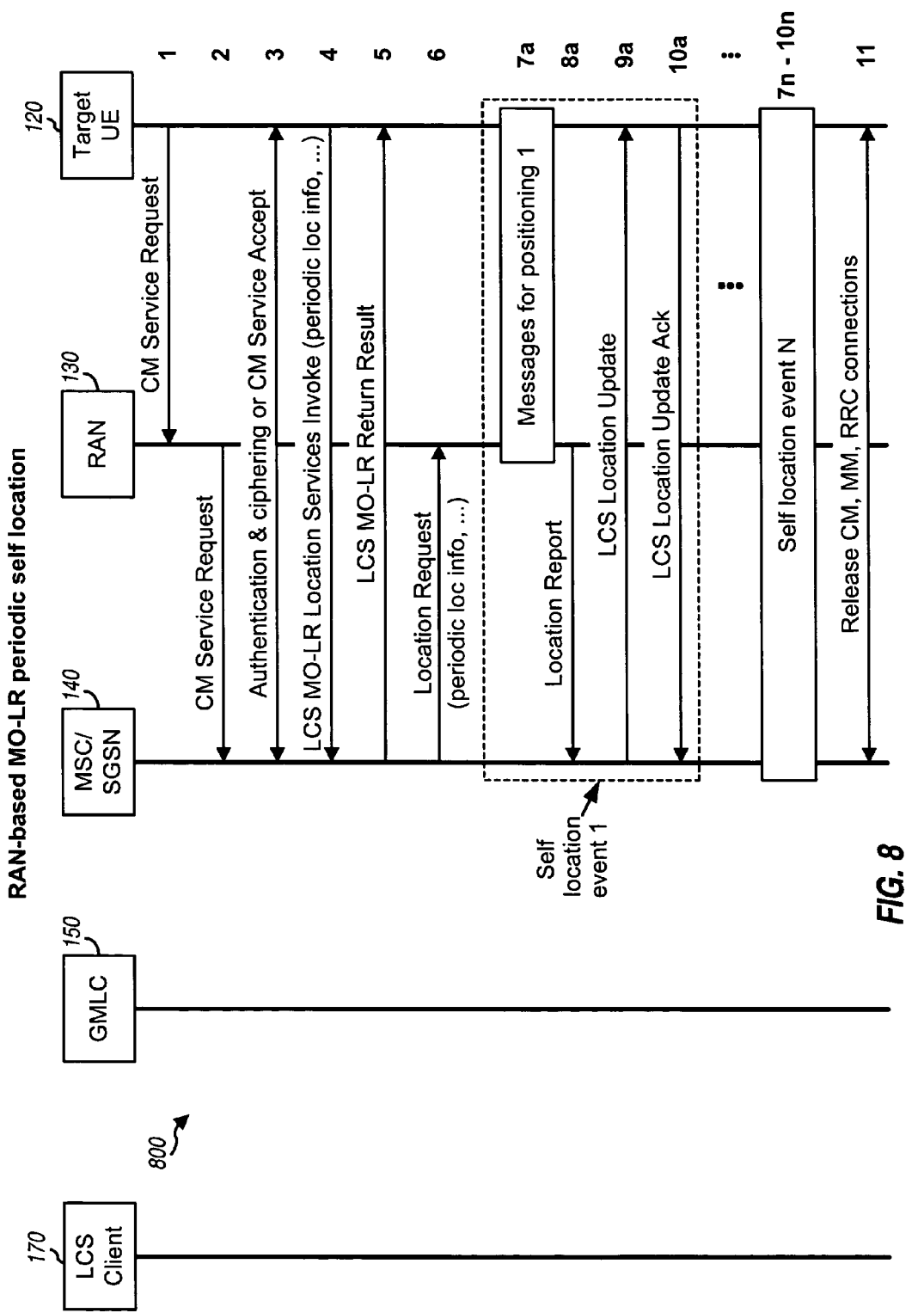
FIG. 8 shows a message flow for RAN-based MO-LR periodic self location.

FIG. 8 shows an embodiment of a message flow 800 for RAN-based MO-LR periodic self location. Periodic self location may be viewed as a special case of periodic location reporting where the LCS client is UE 120 instead of external LCS client 170.

Steps 1 through 3 of message flow 800 are the same as steps 1 through 3 of message flow 400 in FIG. 4. UE 120 then sends to MSC/SGSN 140 an LCS MO-LR Location Services Invoke message to request periodic self location (step 4). This message contains pertinent information such as, e.g., the periodic location information (e.g., a start time, a reporting interval, and one of a stop time, a reporting duration, or a predetermined number of reports), the LCS QoS, and so on. The message also indicates that periodic location estimates should be sent to UE 120. MSC/SGSN 140 verifies that UE 120 is authorized for the requested location service based on a subscription profile for the UE (also step 4). If the location request is authorized, then MSC/SGSN 140 sends an LCS MO-LR Return Result message to UE 120 to indicate acceptance of the periodic self location request (step 5). MSC/SGSN 140 also sends to RAN 130 a Location Request message that contains the periodic self location request, the periodic location information, the UE capabilities, and the LCS QoS (step 6).

A message flow is then performed to obtain the first location estimate for UE 120 (step 7*a*). Step 7*a* may include steps 3 through 8*a* of message flow 500 in FIG. 5 or steps 3 through 8*a* of message flow 600 in FIG. 6. RAN 130 receives a location estimate for UE 120 from the message flow in step 7*a* and sends to MSC/SGSN 140 a Location Report message that contains this location estimate and other relevant information (step 8*a*). MSC/SGSN 140 then sends to UE 120 an LCS Location Update message containing the first location estimate and relevant information (step 9*a*). UE 120 returns an LCS Location Update Acknowledgment message that acknowledges receipt of the first location estimate (step 10*a*). This message may also include an indication to cancel the periodic self location if such is desired by UE 120. For each subsequent self location event i, for i=b . . . n, a message flow is performed to obtain a location estimate for UE 120 (step 7*i*) and to send the location estimate to MSC/SGSN 140 (step 8*i*). MSC/SGSN 140 then returns the location estimate to UE 120 (steps 9*i* and 10*i*). After all of the location reporting events are completed, MSC/SGSN 140 may instigate release of the CM, MM or GMM, and RR/RRC connections to UE 120.

In another embodiment, the LCS MO-LR Return Result message is not sent in step 5 in FIG. 8 and is sent instead after step 10*n*, similar to message flow 400 in FIG. 4. In another embodiment, the LCS Location Update message in each step 9*i* and the LCS Location Update Acknowledgment in each step 10*i* are replaced by the LCS Notification Invoke message and the LCS Notification Return Result message, respectively, which are existing 3GPP messages. Again, the use of existing 3GPP messages may reduce implementation impacts to MSC/SGSN 140 and UE 120.

RAN-based periodic location reporting may also be used for mobile stations (MS) communicating with a GERAN. A packet mode periodic location reporting procedure may be used for a periodic location request received by 2G-SGSN 140*a* in FIG. 1B. A circuit mode periodic location reporting procedure may be used for a periodic location request received by 2G-MSC 140*b*. For GERAN periodic location reporting in circuit mode, an MS may operate in a dedicated mode and may be assigned a signaling channel (e.g., an SDCCH) for the entire duration of periodic location reporting since a base station subsystem (BSS) in GSM does not have capability to dynamically release and later reassign a dedicated signaling channel during the intervals of periodic location. For GERAN periodic location reporting in packet mode, the MS may be dynamically assigned a signaling channel when needed to transfer a message between the MS and the BSS. In the following description, UE 120 (UMTS terminology) is referred to as MS 120 (GSM terminology). MS 120 communicates with a BSS in GERAN 130*a*.

Figure 9:
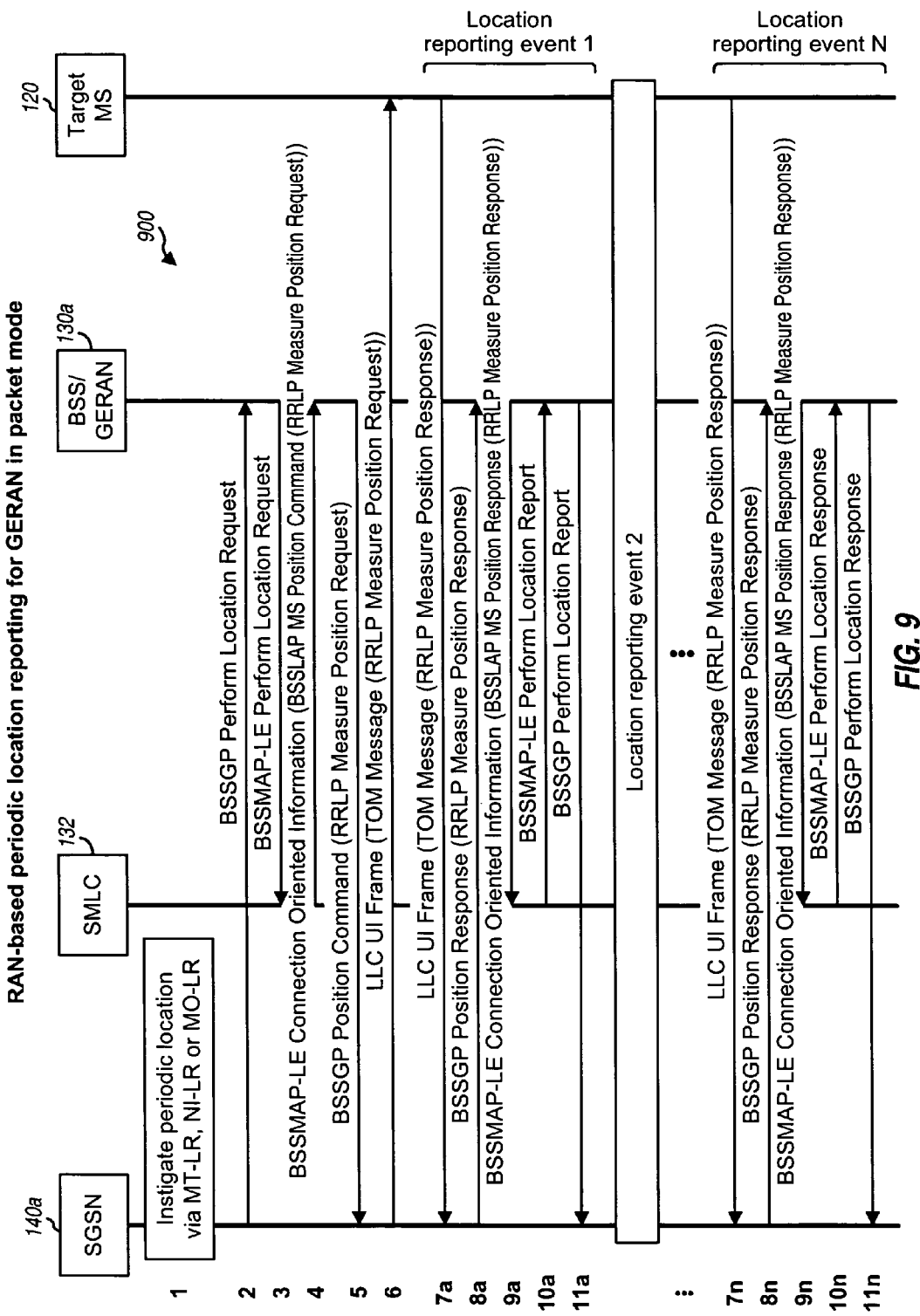
FIGS. 9 and 10 show message flows for RAN-based periodic location reporting for GERAN in packet mode and circuit mode, respectively.

FIG. 9 shows an embodiment of a message flow 900 for RAN-based periodic location reporting for GERAN in packet mode. LCS client 170 or MS 120 may initiate a request to periodically send location estimates for MS 120 to LCS client 170 (step 1). The periodic location may be instigated by MT-LR, NI-LR or MO-LR, e.g., as described above for FIG. 2A, 2B or 3, respectively. The periodic location request may be transferred to SGSN 140*a* via one or more GMLCs for an MT-LR originated by LCS client 170 or via the BSS for an MO-LR originated by MS 120. The request may include periodic location information identifying the schedule or conditions (e.g., events) for sending location estimates. The request may be agreed by participating entities, e.g., GMLCs 150, SGSN 140*a*, MS 120, and LCS client 170. Periodic location delivery may thereafter be started either by an MO-LR from MS 120 or by SGSN 140*a*, which may perform paging and authentication if MS 120 has reverted to idle mode.

SGSN 140*a* sends a BSSGP Perform Location Request message to the BSS currently serving MS 120 (step 2). This message contains the periodic location request and further includes the periodic location information, QoS, and/or other relevant information. The BSS receives the message and recognizes that the request is for periodic location rather than single shot location. The BSS then sends the periodic location request and the periodic location information in a BSSMAP-LE Perform Location Request message to SMLC 132 (step 3).

SMLC 132 receives the message from the BSS, evaluates the periodic location request, and selects a positioning method. If A-GPS and/or E-OTD is selected, then SMLC 132 sends to the BSS a BSSMAP-LE Connection Oriented Information message that contains a BSSLAP MS Position Command message, which further contains an RRLP Measure Position Request message (step 4). The BSSLAP MS Position Command message may carry an indication that periodic location is being requested, and the BSS may record this information. The RRLP Measure Position Request message may contain the periodic location information, a subset of this information, or a converted set or subset of this information. The RRLP Measure Position Request message may also contain assistance data to assist MS 120 perform A-GPS and/or E-OTD measurements and, if MS-based positioning is selected, to assist MS 120 compute a location estimate. If the assistance data does not fit into one RRLP Measure Position Request message, then SMLC 132 may send some or all of the assistance data and other information, including periodic location information, to MS 132 in one or more RRLP Assistance Data messages (not shown in FIG. 9) before sending the RRLP Measure Position Request message. MS 120 would then acknowledge each RRLP Assistance Data message with an RRLP Assistance Data Acknowledgment message.

The BSS sends to SGSN 140*a* a BSSGP Position Command message containing the RRLP Measure Position Request message received from SMLC 132 (step 5). SGSN 140*a* then sends to MS 120 a Logical Link Control (LLC) Unconfirmed Information (UI) Frame message containing a TOM message, which carries the RRLP Measure Position Request message received from SMLC 132 (step 6). MS 120 receives the message from SGSN 140*a* and recognizes the periodic location request based on the periodic location information included in the RRLP Measure Position Request message (or in a preceding RRLP Assistance Data message). If A-GPS is selected, then MS 120 may acquire and measure signals from GPS satellites using assistance data (if any) upon receiving the RRLP Measure Position Request message or a preceding Assistance Data message. If E-OTD is selected, then MS 120 may begin to acquire and measure signals from nearby base stations. MS 120 may also acquire and measure signals from both GPS satellites and base stations if E-OTD and A-GPS are both selected.

When the first scheduled location estimate is due or when the first set of conditions (e.g., an event) occur for which a location estimate is needed, MS 120 performs A-GPS and/or E-OTD measurements. If MS-based positioning was selected, then MS 120 further obtains a location estimate from the measurements. MS 120 then sends the measurements or location estimate in an RRLP Measure Position Response message to SGSN 140*a* (step 7*a*). The RRLP Measure Position Response message is carried in a TOM message, which is in turn carried in an LLC UI Frame message. The TOM message header includes a flag indicating that the RRLP Measure Position Response message is not the last one. The RRLP Measure Position Response message may also carry an indication that more periodic location estimates will be provided later. MS 120 may send more than one RRLP Measure Position Response message if the measurements or location estimate does not fit into a single message (not shown in FIG. 9).

SGSN 140*a* receives the LLC UI Frame message from MS 120 and transfers the RRLP Measure Position Response message in a BSSGP Position Response message to the BSS (step 8*a*). The BSSGP Position Response message header includes a flag indicating that this is not the last RRLP Measure Position Response message. The BSS receives the BSSGP Position Response message from SGSN 140*a* and transfers the RRLP Measure Position Response message in a BSSLAP MS Position Response message, which is carried in a BSSMAP-LE Connection Oriented Information message, to SMLC 132 (step 9*a*). The BSSLAP MS Position Response message header includes a flag indicating that this is not the last RRLP Measure Position Response message. The BSS is aware of the periodic location request (from step 2 and possibly from step 4) and also from the flag setting. The BSS thus expects additional RRLP Measure Position Response messages from MS 120 and does not abort periodic location before all measurements or location estimates (inside RRLP Measure Position Response messages) have been transferred from MS 120.

SMLC 132 computes a location estimate from the measurements provided by MS 120 or verifies any location estimate provided by the MS. SMLC 132 then sends the calculated or verified location estimate in a BSSMAP-LE Perform Location Report message to the BSS (step 10*a*). This message informs the BSS that periodic location is not yet finished and that additional location estimates will be provided later by SMLC 132. The BSS receives the location estimate from SMLC 132 and sends this location estimate in a BSSGP Perform Location Report message to SGSN 140*a* (step 11*a*). This message informs SGSN 140*a* that periodic location is not finished and that additional location estimates will be provided later. SGSN 140*a* then transfers the location estimate to LCS client 170, e.g., via a GMLC using steps 8a through 11a in FIG. 4 or via the BSS.

Steps 7a through 11a are for one location reporting event. These steps may be repeated for each additional location estimate that is scheduled or triggered. If MS 120 is unable to obtain measurements or a location estimate because the available assistance data is no longer valid, then MS 120 may include a request for more assistance data in a RRLP Measure Position Response message sent in a subsequent step 7. This data request may be sent instead of or in addition to measurements or location estimate. Upon receipt of this request in step 9, SMLC 132 would send the requested assistance data to MS 120 using one or more RRLP Assistance Data messages. In one embodiment, both SMLC 132 and MS 120 treat the transfer of assistance data as an additional RRLP transaction occurring in parallel with the pending RRLP transaction for periodic location (e.g., started in steps 4, 5 and 6). MS 120 continues to send periodic measurements or location estimates to SMLC 132 by repeating steps 7a through 11a. In another embodiment, MS 120 may terminate the transfer of periodic measurements or location estimates to SMLC 132 when sending the request for more assistance data. For example, MS 120 may indicate termination of periodic location reporting by including an error indication in the RRLP Measure Position Response message carrying the request for more assistance data. In that case, the TOM message header sent in a subsequent step 7 may include a flag indicating that this is the last RRLP Measure Position Response message. When the BSS receives this flag from SGSN 140a in a subsequent step 8, the BSS forwards this last RRLP Measure Position Response message to SMLC 132 and does not expect any more RRLP Measure Position Response messages from MS 120. SMLC 132 may restart the transfer of periodic measurements or location estimates from MS 120 by repeating steps 4 to 11. SMLC 132 may send the requested assistance data to MS 120 in an RRLP Measure Position Request message and/or one or more RRLP Assistance Data messages.

MS 120 sends the final measurements or location estimate for periodic location to SGSN 140a (step 7n). The measurements or location estimate are sent in an RRLP Measure Position Response message, which is carried in a TOM message, which is further carried in an LLC UI Frame message. These messages are the same as those used in step 7a, except that the TOM message header includes a flag indicating that this is the final RRLP Measure Position Response message. The RRLP Measure Position Response message may contain parameters indicating that this is the last periodic measurements or location estimate. Steps 8n through 11n are similar to steps 8a through 11a. However, a flag indicating that the final RRLP Measure Position Response message is being sent may be included in the BSSGP Position Response message sent by SGSN 140a in step 8n and also in the BSSLAP MS Position Response message sent by the BSS in step 9n. SMLC 132 may send a BSSMAP-LE Perform Location Response message in step 10n, instead of a BSSMAP-LE Perform Location Report message in step 10a, to inform the BSS that the periodic location procedure has ended. The BSS may send a BSSGP Perform Location Response message in step 1 in, instead of a BSSGP Perform Location Report message in step 11a, to inform SGSN 140a that the periodic location procedure has ended. The BSS does not expect any more RRLP Measure Position Response messages from MS 120 unless a new positioning procedure is instigated by SMLC 132. SMLC 132 may instigate more periodic location reporting by repeating steps 4 to 9n. SGSN 140a may continue periodic location reporting by repeating steps 2 to 11n. Otherwise, SGSN 140a may indicate to LCS client 170 that the periodic location reporting is now completed.

Certain exception conditions may arise during message flow 900 in FIG. 9 that require additional action. If MS 120 changes serving cell but remains within the coverage of the same BSS, then the BSS may notify SMLC 132 of the new cell by sending to the SMLC a BSSMAP-LE Perform Location Information message containing the identity of the new cell. For some other exception conditions, such as a cell change to a new BSS, intra-SGSN GPRS routing area update, or P-TMSI reallocation, MS 120 and/or the BSS may abort the periodic location procedure, and SGSN 140a may restart the procedure, e.g., by signaling to the new BSS.

Figure 10:
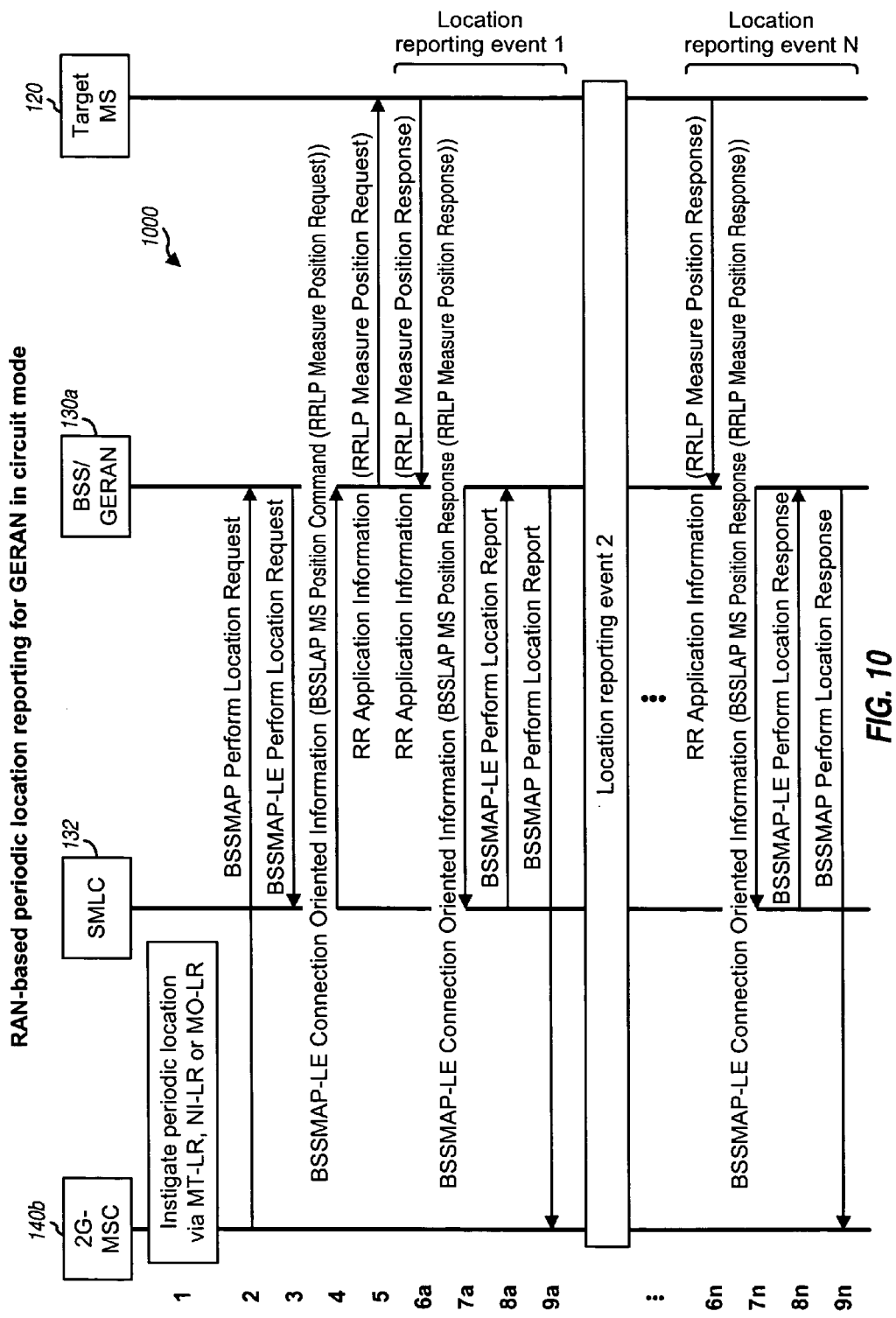

FIG. 10 shows an embodiment of a message flow 1000 for RAN-based periodic location reporting for GERAN in circuit mode. Message flow 1000 for circuit mode is similar to message flow 900 for packet mode. The differences are that SGSN 140a is replaced by 2G-MSC 140b, the BSSGP messages between SGSN 140a and the BSS are replaced by corresponding BSSMAP messages, and the transfer of RRLP messages between the BSS and MS 120 is more direct.

LCS client 170 or MS 120 may initiate a request to periodically send location estimates for MS 120 to LCS client 170 (step 1). The request may be transferred to 2G-MSC 140b via one or more GMLCs or via the BSS. The request may include periodic location information and may be agreed by participating entities, e.g., GMLCs 150, 2G-MSC 140b, MS 120, and LCS client 170. Periodic location delivery may thereafter be started either by an MO-LR from MS 120 or by 2G-MSC 140b, which may perform paging and authentication if MS 120 has reverted to idle mode.

2G-MSC 140b sends a BSSMAP Perform Location Request message to the BSS currently serving MS 120 (step 2). This message contains the periodic location request and further includes the periodic location information, QoS, and other relevant information. The BSS sends the periodic location request in a BSSMAP-LE Perform Location Request message to SMLC 132 (step 3). SMLC 132 receives the message, evaluates the periodic location request, and selects a positioning method. If A-GPS and/or E-OTD is selected, then SMLC 132 sends to the BSS a BSSMAP-LE Connection Oriented Information message that contains a BSSLAP MS Position Command message, which further contains an RRLP Measure Position Request message (step 4).

The BSS sends to MS 120 an RR Application Information message containing the RRLP Measure Position Request message received from SMLC 132 (step 5). MS 120 receives the message from the BSS and recognizes the periodic location request based on the periodic location information included in the RRLP Measure Position Request message (or in a preceding RRLP Assistance Data message). MS 120 may acquire and measure signals from GPS satellites (for A-GPS) and/or nearby base stations (for E-OTD).

When the first scheduled location estimate is due or when the first set of conditions (e.g., an event) occur for which a location estimate is needed, MS 120 performs A-GPS and/or E-OTD measurements and further obtains a location estimate if MS-based positioning was selected. MS 120 then sends the measurements or location estimate in an RRLP Measure Position Response message, which is carried in an RR Application Information message, to the BSS (step 6a). The RR Application Information message header includes a flag indicating that this is not the last RRLP Measure Position Response message. The RRLP Measure Position Response message may also carry an indication that more periodic location estimates will be provided later.

The BSS receives RR Application Information message from MS 120 and transfers the RRLP Measure Position Response message in a BSSLAP MS Position Response message, which is carried in a BSSMAP-LE Connection Oriented Information message, to SMLC 132 (step 7*a*). The BSSLAP MS Position Response message header includes a flag indicating that this is not the last RRLP Measure Position Response message. SMLC 132 computes a location estimate from the measurements provided by MS 120 or verifies any location estimate provided by the MS. SMLC 132 then sends the calculated or verified location estimate in a BSSMAP-LE Perform Location Report message to the BSS (step 8*a*). The BSS receives the location estimate from SMLC 132 and sends this location estimate in a BSSMAP Perform Location Report message to 2G-MSC 140*b* (step 9*a*). 2G-MSC 140*b* then transfers the location estimate to LCS client 170, e.g., via a GMLC or the BSS.

Steps 6*a* through 9*a* are for one location reporting event. These steps may be repeated for each additional location estimate that is scheduled or triggered. MS 120 may obtain more assistance data by sending a request in a RRLP Measure Position Response message in a subsequent step 6. SMLC 132 and MS 120 treat the transfer of assistance data as an additional RRLP transaction occurring in parallel with the pending RRLP transaction for periodic location. Alternatively, MS 120 may terminate the transfer of periodic measurements or location estimates, e.g., by including a flag in the RR Application Information message header to indicate that this is the last RRLP Measure Position Response message. SMLC 132 may then restart the transfer of periodic measurements or location estimates from MS 120 by repeating steps 4 to 9.

MS 120 sends the final measurements or location estimate for periodic location to the BSS (step 6*n*). The measurements or location estimate are sent in an RRLP Measure Position Response message, which is carried in an RR Application Information message. These messages are the same as those used in step 6*a*, except that the RR Application Information message header includes a flag indicating that this is the final RRLP Measure Position Response message. The RRLP Measure Position Response message may contain parameters indicating that this is the last periodic measurements or location estimate. Steps 7*n* through 9*n* are similar to steps 7*a* through 9*a*. However, the BSSLAP MS Position Response message sent by the BSS in step 7*n* includes a flag indicating that the final RRLP Measure Position Response message is being sent. SMLC 132 may send a BSSMAP-LE Perform Location Response message in step 8*n* and the BSS may send a BSSMAP Perform Location Response message in step 9*n* to indicate that the periodic location procedure has ended. SMLC 132 may instigate more periodic location reporting by repeating steps 4 to 7*n*. 2G-MSC 140*b* may continue periodic location reporting by repeating steps 2 to 9*n*. Otherwise, 2G-MSC 140*b* may indicate to LCS client 170 that the periodic location reporting is now completed.

Certain exception conditions may arise during message flow 1000 in FIG. 10 that require additional action. If MS 120 changes serving cell but remains within the coverage of the same BSS or if some other RR management procedure is conducted between the BSS and MS 120 that still leaves a circuit mode radio signaling link between the BSS and MS 120, then MS 120 may abort the positioning, and SMLC 132 may restart the positioning in MS 120 for either single shot or periodic positioning. Alternatively, the BSS may inform SMLC 132 of any cell change (e.g., by sending a BSSMAP-LE Perform Location Information message), and MS 120, the BSS and SMLC 132 may continue the periodic positioning.

For some other exception conditions, such as handover to a new BSS, MS 120 and/or the BSS may abort the periodic location procedure, and 2G-MSC 140*b* may restart the procedure, e.g. by signaling to the new BSS.

Many of the messages in FIGS. 9 and 10 are described in 3GPP TS 43.059 and used for one shot location of an MS. These messages may be used for periodic location whenever possible in order to simplify implementation of periodic location. Other messages may also be used for FIGS. 9 and 10.

FIGS. 4 through 10 show exemplary message flows that may be used for RAN-based periodic location reporting. The message flows in FIGS. 4 through 7, 9 and 10 may be used as part of the MT-LR and MO-LR periodic procedures shown in FIGS. 2A and 3, respectively, after a periodic location request has been authorized. These message flows may also be used as stand-alone procedures and hence are not restricted to be part of the MT-LR and MO-LR periodic procedures. Other message flows for RAN-based periodic location reporting may also be implemented for use with the MT-LR and MO-LR periodic procedures.

UE 120 may initially communicate with a RAN (e.g., a GERAN) that does not have periodic LCS capabilities and does not support the message flows in FIGS. 4 through 10. The periodic location reporting may then be achieved in other manners, e.g., with UE 120 or a network entity (e.g., GMLC 150) periodically initiating a message flow to obtain and transfer a single location estimate for UE 120 to LCS client 170. If UE 120 subsequently moves within the coverage of a RAN (e.g., a UTRAN) that has periodic LCS capabilities, then UE 120 can switch to the new RAN, and the periodic LCS capabilities of this new RAN may be utilized to efficiently provide periodic location reporting.

For simplicity, the description above for RAN-based periodic location reporting assumes a deployment with one GMLC (e.g., as shown in FIG. 1A) and positioning being performed for each location estimate. The RAN-based periodic location reporting may also be used for a deployment with multiple GMLCs (e.g., as shown in FIG. 1B). Improved efficiency may be achieved by employing (1) GLMC short circuit for the deployment with multiple GMLCs and (2) MO-LR short circuit for deployments with one or multiple GMLCs. GLMC short circuit refers to the exchange of messages directly between R-GMLC 150*c* and MSC/SGSN 140 in FIG. 1B, thereby bypassing or short circuiting V-GMLC 150*a* and H-GMLC 150*b*. MO-LR short circuit refers to the bypass of the positioning for each location reporting event if a suitable location estimate is available to UE 120 and the use of MO-LR short circuit is allowed. GMLC short circuit, MO-LR short circuit, or both types of short circuit may be used to save system resources and to provide a faster response for a location transfer to LCS client 170. Either MO-LR short circuit or RAN-based periodic reporting may be used for UE-based positioning. However, if the UE does not support MO-LR short circuit or the LCS client or any of the involved PLMNs denies the use of MO-LR short circuit, then only RAN-based periodic positioning may be suitable for UE based positioning. Conversely, if the RAN (e.g., GERAN) does not support RAN-based periodic reporting, then only MO-LR short circuit may be suitable (if allowed and supported). For UE-assisted positioning or network-based positioning (e.g., for a UE that only supports UE-assisted positioning), MO-LR short circuit is not used and only RAN-based positioning is may be suitable. Hence, MO-LR short circuit and RAN-based periodic reporting may be applicable under different circumstances.

The use of MO-LR short circuit may be controlled for various reasons such as, e.g., to deal with a lack of trust in either the UE accuracy and reliability or the UE integrity (e.g. spoofing), for billing and subscription issues, and so on. For example, the use of MO-LR short circuit may be allowed if UE 120 is trusted to provide location estimates directly to MSC/SGSN 140 without verification by RAN 130. The use of GLMC short circuit may also be controlled for reasons relating to billing, subscription, and so on.

In an embodiment, one entity (e.g., UE 120, MSC/SGSN 140, or R-GMLC 150*c*) may request for permission to use GMLC short circuit and/or MO-LR short circuit for subsequent location reporting events. Any other entity (e.g., MSC/SGSN 140, V-GMLC 150*a*, H-GMLC 150*b*, R-GMLC 150*c*, UE 120 and LCS client 170) may accept or reject the request for each type of short circuit. In another embodiment, one entity (e.g., UE 120, MSC/SGSN 140, or R-GMLC 150*c*) may indicate a willingness or a capability to support GMLC short circuit and/or MO-LR short circuit without specifically requesting to use these short circuits. Any entity among V-GMLC 150*a*, H-GMLC 150*b*, R-GMLC 150*c*, UE 120 and LCS client 170 may then accept or reject the willingness or capability to support each type of short circuit. One entity (e.g., H-GMLC 152) may decide whether to use each type of short circuit if all entities indicate willingness and capability for that short circuit. For all embodiments, the request to use GMLC short circuit and the request to use MO-LR short circuit may be treated as independent requests. Furthermore, any agreement on using GMLC short circuit and/or MO-LR short circuit may be applicable to all of the PLMNs in the list sent by MSC/SGSN 140 to UE 120.

In yet another embodiment, any entity among UE 120, MSC/SGSN 140, V-GMLC 150*a*, H-GMLC 150*b*, and R-GMLC 150*c* can autonomously decide whether or not to use GLMC short circuit and whether or not to use MO-LR short circuit.

For MT-LR message flow 200 in FIG. 2A, R-GMLC 150*c* may send an LCS Service Request message to H-GMLC 150*b*, which may send an LCS Service Request message to V-GMLC 150*a*, which may send a Provide Subscriber Location message to MSC/SGSN 140 to request for periodic location reporting. The message sent by each entity may contain (1) the address of R-GMLC 150*c*, if GMLC short circuit is preferred, and (2) an indication as to whether MO-LR short circuit is allowed or preferred. In an embodiment, R-GMLC 150*c*, H-GMLC 150*b*, V-GMLC 150*a*, and MSC/SGSN 140 may each accept or reject the use of GMLC short circuit and may each accept or reject the use of MO-LR short circuit.

For MO-LR message flow 300 in FIG. 3, UE 120 may include (1) a request for use GMLC short circuit and/or (2) a request for use MO-LR short circuit (e.g., if UE 120 supports the UE-based mode) in the LCS MO-LR Location Services Invoke message sent to MSC/SGSN 140 in step 4 of message flow 300. In another embodiment, MSC/SGSN 140 may decide one or both requests itself without an indication from UE 120. In either case, the short circuit request(s) may be forwarded to V-GMLC 150*a*, then to H-GMLC 150*b*, then to R-GMLC 150*c*, and then to LCS client 170. LCS client 170 sends a response for the UE request(s) to R-GMLC 150*c*, which sends its response to H-GMLC 150*b*, which sends its response to V-GMLC 150*a*, which sends its response to MSC/SGSN 140. The response sent by each entity incorporates the response received from the preceding entity (if any) and indicates acceptance or rejection of the periodic location request and acceptance or rejection of each short circuit request (if sent).

For both MT-LR message flow 200 and MO-LR message flow 300, MSC/SGSN 140 may receive the following information (in additional to the information listed above):

1. an MO-LR short circuit indication that indicates if UE 120 is allowed or expected to provide location estimates directly to MSC/SGSN 140 without verification in RAN 130,
2. a GMLC short circuit indication that indicates if location estimates can or will be sent directly to R-GMLC 150*c*,
3. an address of H-GMLC 150*b* to be used to send location information to H-GMLC 150*b*, e.g., if GMLC short circuit is not requested or is rejected, and
4. an address of R-GMLC 150*c* to be used to send location information directly from MSC/SGSN 140 to R-GMLC 150*c*, e.g., if GMLC short circuit is accepted.

If MO-LR short circuit is allowed, then UE 120 may include a location estimate available at the UE in the LCS MO-LR Location Services Invoke message sent to MSC/SGSN 140. RAN 130 or SAS 132 would not need to compute the location estimate for UE 120.

If GMLC short circuit is accepted, then MSC/SGSN 140 may store the address of R-GMLC 150*c* or UE 120 may send the R-GMLC address in each location reporting event. MSC/SGSN 140 may then send each location estimate directly to R-GMLC 150*c* using the R-GMLC address and may bypass V-GMLC 150*a* and H-GMLC 150*b*.

For clarity, each of the message flows in FIGS. 2 through 10 shows a specific sequence of steps. Each message flow may include additional, fewer, or different steps than the steps shown for that message flow. The steps for each message flow may be performed in the order shown in that message flow or in a different order. Each step in each message flow may in general include any number of message exchanges, any type of processing at any entity, and so on.

Also for clarity, specific messages used by (or applicable to) 3GPP are shown for the message flows in FIGS. 2 through 10. Other networks and other location architectures typically use messages that are different from the messages described above. In general, any signaling may be used to exchange pertinent information among the various entities to achieve the functionality described above for location reporting. The signaling may comprise messages, packets, indications, flags, or data sent in some other form.

For clarity, the techniques have been specifically described above for 3GPP-based networks utilizing a control plane to support location services. The techniques may also be used for other networks and other location architectures, such as a SUPL architecture and a pre-SUPL architecture promulgated by Open Mobile Alliance (OMA), a 3GPP2 control plane architecture described in IS-881 and 3GPP2 X.S0002, a 3GPP2 user plane architecture described in X.S0024, and so on. A control plane (which is also commonly called a signaling plane) is a mechanism for carrying signaling for higher-layer applications and may be implemented with network-specific protocols and signaling messages. A user plane is a mechanism for carrying data for higher-layer applications and employs a user-plane bearer, which is typically implemented with protocols such as User Datagram Protocol (UDP), Transmission Control Protocol (TCP), and Internet Protocol (IP), all of which are well known in the art. Messages supporting location services and positioning are carried as part of signaling in a control plane architecture and as part of data in a user plane architecture. The content of the messages may, however, be similar or even identical in both architectures. The short circuit techniques may also be used for circuit-switched (CS) based modes and packet-switched (PS) based modes, although the messages may be different.

Figure 11:
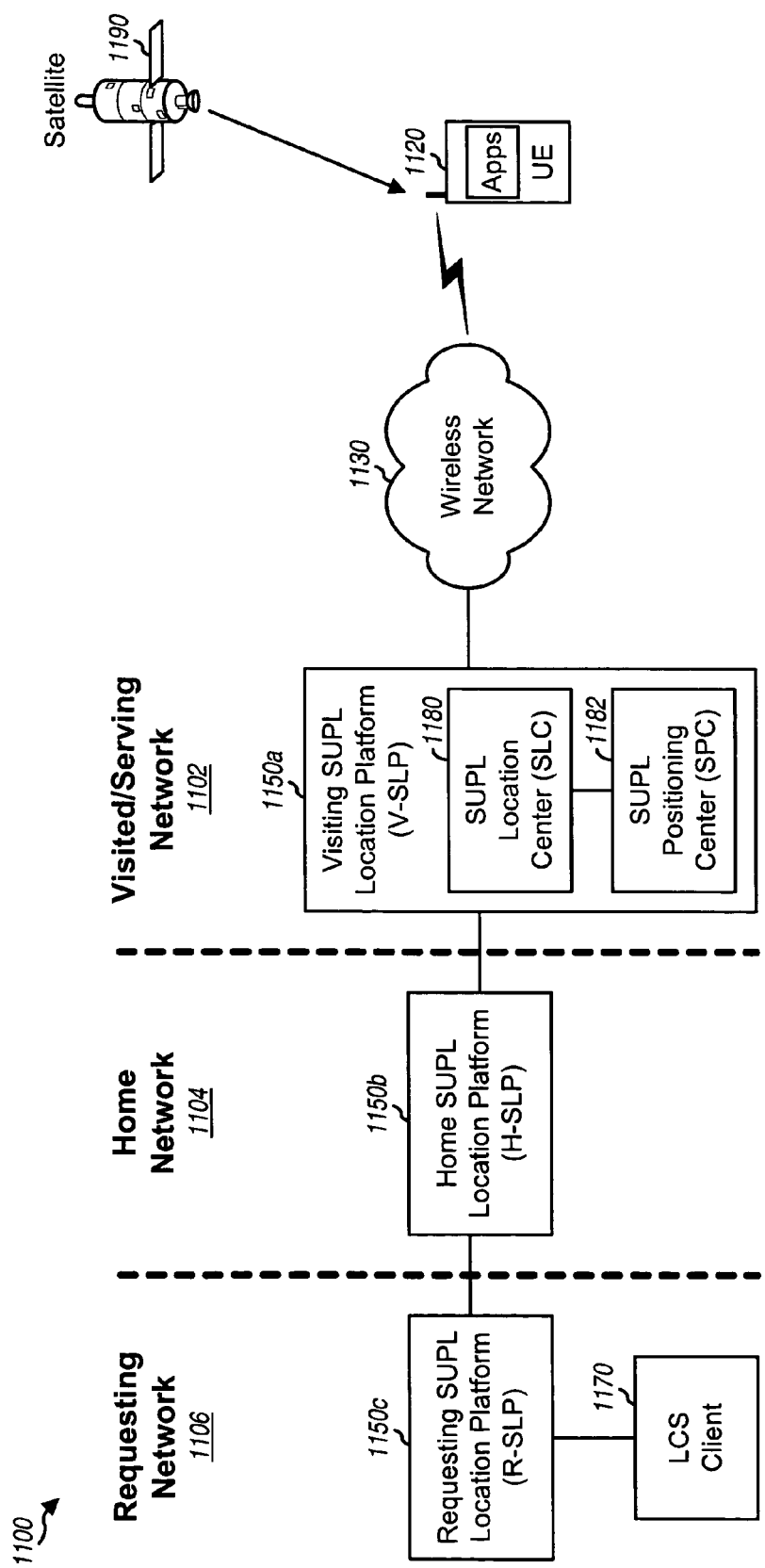
FIG. 11 shows another network deployment.

FIG. 11 shows a SUPL deployment 1100 that includes a visited/serving network 1102, a home network 1104, and a requesting network 1106. Visited network 1102 includes a wireless network 1130 and a visiting SUPL location platform (V-SLP) 1150*a*. Wireless network 1130 provides wireless communication for wireless devices located within the coverage area of the wireless network. A wireless device is also called a SUPL enabled terminal (SET). V-SLP 1150*a* includes a SUPL location center (SLC) 1180 and may include a SUPL positioning center (SPC) 1182. SLC 1180 is similar to V-GMLC 150*a* and performs various functions for location services. SPC 1182 is similar to SMLC/SAS 132 and supports positioning for wireless devices. Home network 1104 includes a home SLP (H-SLP) 1150*b* that supports location services and positioning for home network 1104. Requesting network 1106 includes a requesting SLP (R-SLP) 1150*c* that supports location services and positioning for LCS clients.

The techniques described herein may be used in SUPL deployment 1100. For RAN-based periodic location reporting, V-SLP 1150*a* or H-SLP 1150*b* may coordinate and control periodic location reporting for a wireless device 1120, e.g., as described above. In this case, no RAN would be specifically involved and the role of the RAN would be taken by V-SLP 1150*a* and/or H-SLP 1150*b* and/or by an SPC within either of these (e.g., by SPC 1182). The message interaction (e.g., transfer of RRC Measurement Control message and RRC Measurement Report message) between UE 1120 and V-SLP 1150*a* or H-SLP 1150*b* would then be similar to the exchange of these messages between UE 120 and RAN/SRNC 130 in FIGS. 5 and 6 except that the messages (e.g., RRC messages) would be transferred differently, e.g., using TCP/IP and a SUPL positioning protocol defined by OMA instead of using 3GPP control plane signaling. For GMLC short circuit in a non-proxy mode, wireless device 1120 or V-SLP 1150*a* may send a location estimate directly to R-SLP 1150*c*, which then forwards the location estimate to an LCS client 1170 and bypasses H-SLP 1150*b* and possibly V-SLP 1150*a*. For short circuit in a proxy mode, wireless device 1120 may send a location estimate to H-SLP 1150*b*, which then forwards the location estimate to R-SLP 1150*c*, which further forwards the location estimate to LCS client 1170 and bypasses interaction with V-SLP 1150*a*.

Figure 12:
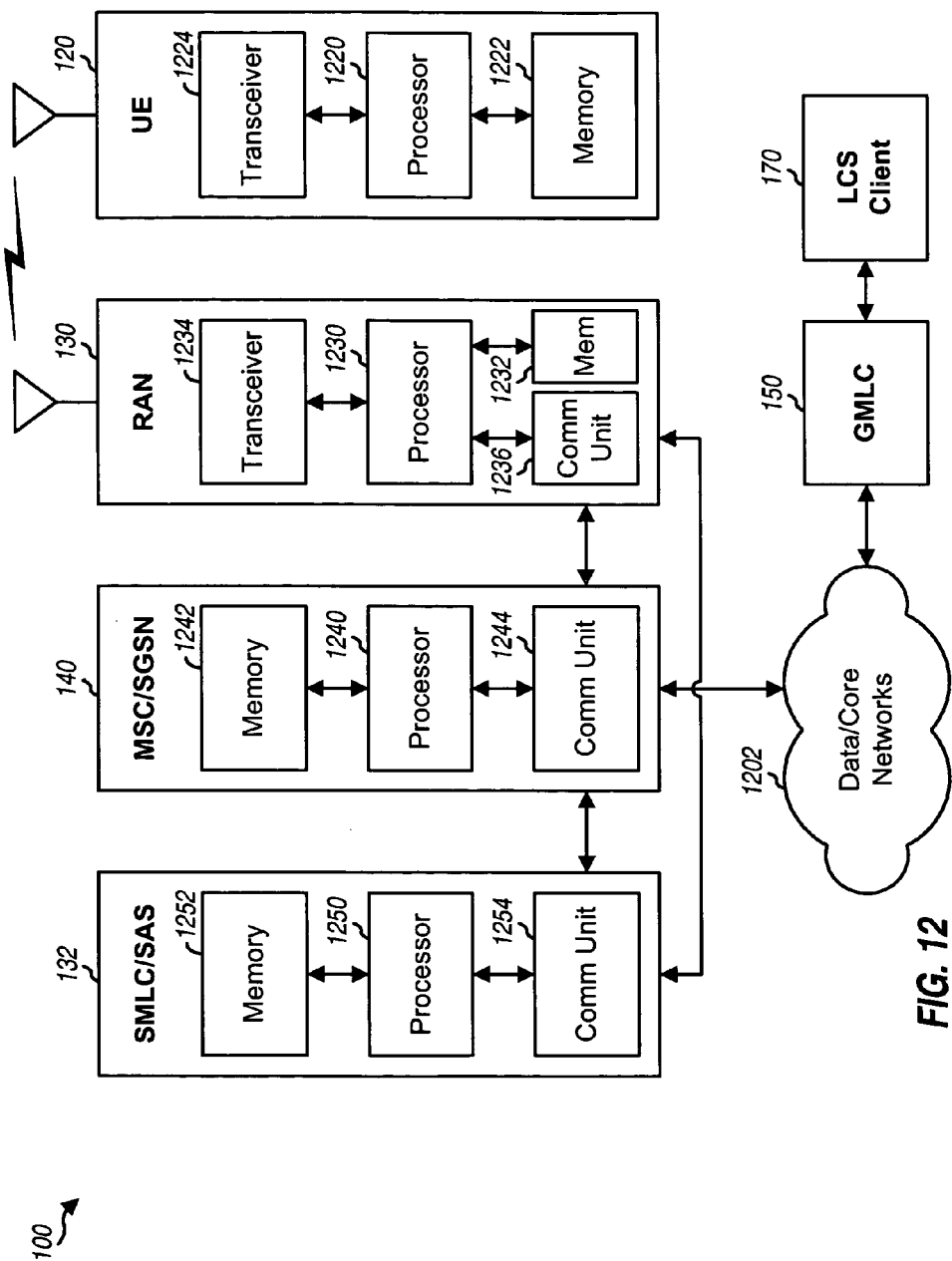
FIG. 12 shows a block diagram of various network entities in FIG. 1.

FIG. 12 shows a block diagram of various network entities and UE 120 in 3GPP-based network 100 in FIG. 1. RAN 130 provides wireless communication for network 100 and typically includes at least one RNC and multiple base stations or Node Bs. For simplicity, only one processor 1230, one memory unit 1232, one transceiver 1234, and one communication unit 1236 are show for RAN 130. Each RNC and each base station typically includes one or more processors, memory units, communication units, and so on, and each base station typically includes transceiver 1234. Also for simplicity, only one processor 1220, one memory unit 1222, and one transceiver 1224 are show for UE 120. UE 120 may support wireless communication and may process GPS signals with one or more receivers, one or more antennas, one or more processors, and so on.

On the downlink, base stations in RAN 130 transmit traffic data, signaling, and pilot to the UEs within their coverage area. These various types of data are processed by processor 1230 and conditioned by transceiver 1234 to generate a downlink signal, which is transmitted via an antenna. At UE 120, the downlink signals from one or more base stations are received via an antenna, conditioned by a transceiver 1224, and processed by a processor 1220 to obtain various types of information for location services. For example, processor 1220 may obtain time of arrival of received signals (which may be used for positioning), decoded messages used for the message flows described above, and so on. Memory units 1222 and 1232 store program codes and data for processors 1220 and 1230, respectively, at UE 120 and RAN 130. On the uplink, UE 120 may transmit traffic data, signaling, and pilot to one or more base stations in RAN 130. These various types of data are processed by processor 1220 and conditioned by transceiver 1224 to generate an uplink signal, which is transmitted via the UE antenna. At RAN 130, the uplink signal from UE 120 and other UEs are received and conditioned by transceiver 1234 and further processed by processor 1230 to obtain various types of information (e.g., data, signaling, reports, and so on). A communication (Comm) unit 1236 allows RAN 130 to communicate with SMLC/SAS 132 and MSC/SGSN 140.

MSC/SGSN 140 includes a processor 1240 that performs processing for MSC/SGSN 140, a memory unit 1242 that stores program codes and data for processor 1240, and a communication unit 1244 that allows MSC/SGSN 140 to communicate with RAN 130, SMLC/SAS 132, and other network entities via data/core networks 1202. SMLC/SAS 132 includes a processor 1250 that performs processing for SMLC/SAS 132, a memory unit 1252 that stores program codes and data for processor 1250, and a communication unit 1254 that allows SMLC/SAS 132 to communicate with RAN 130 and MSC/SGSN 140. In general, each network entity may include one or more processors, memory units, communication units, controllers, and so on. Data/core networks 1202 may include a core network and/or other private/public data networks.

The techniques described herein may be implemented by various means. For example, the techniques may be implemented in hardware, firmware, software, or a combination thereof. For a hardware implementation, the units used to perform the processing at each entity may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software implementation, the techniques may be implemented with modules (e.g., procedures, functions, and so on) that perform the functions described herein. The software codes may be stored in a memory unit (e.g., memory unit 1222, 1232, 1242, or 1252 in FIG. 12) and executed by a processor (e.g., processor 1220, 1230, 1240, or 1250). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of providing location services, comprising:
   receiving a periodic request from a user equipment (UE) to initiate periodic reporting of location of the UE to a client entity wherein the periodic request includes periodic location information indicative of when to send location estimates for the UE to the client entity;
   forwarding the periodic request to a radio access network (RAN) to initiate periodic reporting of the location of the UE to the client entity, wherein the RAN coordinates and controls the periodic reporting of UE location to the client entity;

for each location reporting indicated by the periodic location information,
receiving from the RAN a location estimate for the UE, and
sending the location estimate for the UE toward the client entity; and sending signaling to the UE after each location reporting to convey results of a prior location reporting, to allow for cancellation of the periodic reporting.

2. The method of claim 1, further comprising:
receiving a request sent by the client entity for periodic reporting of the UE location to the client entity; and
forwarding the request to the UE.

3. The method of claim 1, further comprising:
receiving a request directly from the client entity for periodic reporting of the UE location to the client entity; and
forwarding the request to the UE.

4. The method of claim 1, further comprising:
receiving from the UE an initial request for periodic reporting of the UE location to the client entity; and
forwarding the initial request toward the client entity.

5. The method of claim 1, wherein the RAN is associated with a first location center, and wherein the sending the location estimate for the UE toward the client entity comprises sending the location estimate for the UE directly to a second location center and bypassing the first location center, wherein the second location center is associated with the client entity, and wherein the first and second location centers are associated with different networks.

6. The method of claim 5, wherein the sending the location estimate for the UE directly to the second location center comprises sending the location estimate for the UE directly to the second location center and bypassing the first location center and a third location center, wherein the third location center is associated with a home network for the UE.

7. The method of claim 5, further comprising:
storing an address of the second location center.

8. The method of claim 1, further comprising:
sending signaling to the UE prior to each location reporting to convey results of a prior location reporting, to inform the UE of a current location reporting, to allow for denial of the current location reporting, to allow for cancellation of the periodic reporting, or a combination thereof.

9. The method of claim 1, further comprising:
sending signaling to the UE after completion of the periodic reporting to indicate completion of the periodic reporting, to convey results of the periodic reporting, or a combination thereof.

10. The method of claim 1, wherein the sending the location estimate for the UE toward the client entity comprises sending the location estimate for the UE to a location center associated with the client entity, wherein the client entity is external to the UE.

11. The method of claim 1, wherein the sending the location estimate for the UE toward the client entity comprises sending to the UE the location estimate for the UE, wherein the client entity is at the UE.

12. An apparatus comprising:
a communication unit operative to facilitate exchange of signaling between a network entity and a radio access network (RAN) and between the network entity and a location center; and
a processor operative to receive a periodic request from a user equipment (UE) to initiate periodic reporting of location of the UE to a client entity wherein the periodic request includes periodic location information indicative of when to send location estimates for the UE to the client entity and forward the periodic request to the RAN to initiate periodic reporting of the location of the UE to the client entity and, for each location reporting, to receive from the RAN a location estimate for the UE and to send the location estimate for the UE to the location center, and send signaling to the UE after each location reporting to convey results of a prior location reporting, to allow for cancellation of the periodic reporting, wherein the RAN coordinates and controls the periodic reporting of UE location to the client entity.

13. The apparatus of claim 12, wherein the location center is associated with the client entity, wherein the RAN is associated with another location center, and wherein the processor is operative to send the location estimate for the UE directly to the location center associated with the client entity and to bypass the location center associated with the RAN.

14. The apparatus of claim 12, wherein the processor is operative to send signaling to the UE prior to or after each location reporting to convey results of a prior location reporting, to inform the UE of a current or next location reporting, to allow for denial of the current or next location reporting, to allow for cancellation of the periodic reporting, or a combination thereof.

15. The apparatus of claim 12, wherein the processor is operative to send signaling to the UE after completion of the periodic reporting to indicate completion of the periodic reporting, to convey results of the periodic reporting, or a combination thereof.

16. An apparatus comprising:
means for receiving a periodic request from a user equipment (UE) to initiate periodic reporting of location of the UE to a client entity wherein the periodic request includes periodic location information indicative of when to send location estimates for the UE to the client entity;
means for forwarding the periodic request to a radio access network (RAN) to initiate periodic reporting of the location of the UE to the client entity, wherein the RAN coordinates and controls the periodic reporting of UE location to the client entity;
means for processing each location reporting indicated by the periodic location information, comprising:
means for receiving from the RAN a location estimate for the UE, and
means for sending the location estimate for the UE toward the client entity; and
means for sending signaling to the UE after each location reporting to convey results of a prior location reporting, to allow for cancellation of the periodic reporting.

17. The apparatus of claim 16, wherein the RAN is associated with a first location center, and wherein the means for sending the location estimate for the UE toward the client entity comprises means for sending the location estimate for the UE directly to a second location center and bypassing the first location center, wherein the second location center is associated with the client entity, and wherein the first and second location centers are associated with different networks.

18. The apparatus of claim 16, further comprising:
means for sending signaling to the UE prior to or after each location reporting to convey results of a prior location reporting, to inform the UE of a current or next location reporting, to allow for denial of the current or next location reporting, to allow for cancellation of the periodic reporting, or a combination thereof.

19. The apparatus of claim 16, further comprising:
means for sending signaling to the UE after completion of the periodic reporting to indicate completion of the periodic reporting, to convey results of the periodic reporting, or a combination thereof.

20. A method of providing location services, comprising:
receiving, at a radio access network (RAN), signaling sent by a network entity to initiate periodic reporting of location of a user equipment (UE) to a client entity, wherein the signaling received from the network entity includes periodic location information indicative of when to send location estimates for the UE to the client entity;
coordinating and controlling the periodic reporting of UE location to the client entity;
for each location reporting indicated by the periodic location information,
  receiving location information from the UE or concerning the UE,
  forwarding the location information to a positioning entity,
  receiving from the positioning entity a location estimate for the UE,
  the location estimate being determined based on the location information, and
  sending the location estimate for the UE to the network entity; and
receiving signaling after each location reporting to convey results of a prior location reporting, to allow for cancellation of the periodic reporting.

21. The method of claim 20, wherein the periodic location information indicates a predetermined number of location reporting and a time interval between successive location reporting.

22. The method of claim 20, further comprising:
sending the periodic location information to the UE.

23. The method of claim 20, wherein the location information comprises measurements obtained by the UE, or the RAN, or both the UE and the RAN.

24. The method of claim 20, further comprising:
exchanging signaling with a positioning entity to pass coordination and control of the periodic reporting to the positioning entity.

25. The method of claim 20, further comprising:
receiving from the positioning entity assistance data for making measurements used for deriving the location estimate for the UE; and
sending the assistance data to the UE.

26. An apparatus comprising:
a communication unit operative to facilitate exchange of signaling between a radio access network (RAN) and a network entity;
a transceiver operative to facilitate communication between the RAN and a user equipment (UE); and
a processor operative to receive signaling sent by the network entity to initiate periodic reporting of location of the UE to a client entity, to coordinate and control the periodic reporting of UE location to the client entity and, for each location reporting, to receive location information from the UE or concerning the UE, to forward the location information to a positioning entity, to receive from the positioning entity a location estimate for the UE, the location estimate being determined based on the location information, to send the location estimate for the UE to the network entity, and to receive signaling after each location reporting to convey results of a prior location reporting, to allow for cancellation of the periodic reporting, wherein the signaling received from the network entity includes periodic location information indicative of when to send location estimates for the UE to the client entity.

27. The apparatus of claim 26, wherein the location information comprises measurements obtained by the UE, or the RAN, or both the UE and the RAN.

28. The apparatus of claim 26, wherein the processor is operative to exchange signaling with the positioning entity to pass coordination and control of the periodic reporting to the positioning entity.

29. The apparatus of claim 26, wherein the RAN is a Universal Terrestrial Radio Access Network (UTRAN) and the network entity is a mobile services switching center (MSC) or a serving GPRS support node (SGSN).

30. The apparatus of claim 26, wherein the RAN is a GSM EDGE Radio Access Network (GERAN) and the network entity is a mobile services switching center (MSC) or a serving GPRS support node (SGSN).

31. An apparatus comprising:
means for receiving at a radio access network (RAN) signaling sent by a network entity to initiate periodic reporting of location of a user equipment (UE) to a client entity, wherein the signaling received from the network entity includes periodic location information indicative of when to send location estimates for the UE to the client entity;
means for coordinating and controlling the periodic reporting of UE location to the client entity;
means for processing each location reporting indicated by the periodic location information, comprising
  means for receiving location information from the UE or concerning the UE,
  means for forwarding the location information to a positioning entity,
  means for receiving from the positioning entity a location estimate for the UE the location estimate being determined based on the location information, and
  means for sending the location estimate for the UE to the network entity; and
means for receiving signaling after each location reporting to convey results of a prior location reporting, to allow for cancellation of the periodic reporting,
and wherein the UE initiates each location reporting by sending a measurement report comprising the location information to the RAN.

32. The apparatus of claim 31, wherein the location information comprises measurements obtained by the UE, or the RAN, or both the UE and the RAN.

33. The apparatus of claim 31, further comprising:
means for exchanging signaling with the positioning entity to pass coordination and control of the periodic reporting to the positioning entity.

34. A method of providing location services performed by a positioning entity, comprising:
receiving signaling sent by a radio access network (RAN) to initiate periodic reporting of location of a user equipment (UE) to a client entity, wherein the signaling received from the RAN includes periodic location information indicative of when to send location estimates for the UE to the client entity;
coordinating and controlling the periodic reporting of UE location to the client entity;
for each location reporting indicated by the periodic location information, receiving from the RAN location information sent by the UE or concerning the UE, obtaining a location estimate for the UE, the location estimate being determined based on the location information, and sending the location estimate for the UE to the RAN; and sending signaling to the UE after each location reporting to convey results of a prior location reporting, to allow for cancellation of the periodic reporting.

35. The method of claim 34, further comprising:

sending to the RAN assistance data for making measurements used for deriving the location estimate for the UE.

36. A positioning entity comprising:

a communication unit operative to facilitate exchange of signaling between the positioning entity and a radio access network (RAN); and a processor operative to receive signaling sent by the RAN to initiate periodic reporting of location of a user equipment (UE) to a client entity, to coordinate and control the periodic reporting of UE location to the client entity, for each location reporting, to receive from the RAN location information sent by the UE or concerning the UE, to obtain a location estimate for the UE, the location estimate being determined based on the location information, and to send the location estimate for the UE to the RAN, and to send signaling to the UE after each location reporting to convey results of a prior location reporting, to allow for cancellation of the periodic reporting, wherein the signaling received from the RAN includes periodic location information indicative of when to send location estimates for the UE to the client entity.

37. The apparatus of claim 36, wherein the processor is operative to send to the RAN assistance data for making measurements by the UE used for deriving the location estimate for the UE.

38. A positioning entity comprising:

means for receiving signaling sent by a radio access network (RAN) to initiate periodic reporting of location of a user equipment (UE) to a client entity, wherein the signaling received from the RAN includes periodic location information indicative of when to send location estimates for the UE to the client entity;

means for coordinating and controlling the periodic reporting of UE location to the client entity;

means for processing each location reporting indicated by the periodic location information, comprising:

means for receiving from the RAN location information sent by the UE or concerning the UE, means for obtaining a location estimate for the UE, the location estimate being determined based on the location information, and means for sending the location estimate for the UE to the RAN; and means for sending signaling to the UE after each location reporting to convey results of a prior location reporting, to allow for cancellation of the periodic reporting.

39. The apparatus of claim 38, further comprising:

means for sending to the RAN assistance data for making measurements by the UE used for deriving the location estimate for the UE.

40. A method of obtaining location services, comprising:

sending a periodic request from a user equipment (UE) to a network entity via a radio access network (RAN) to initiate periodic reporting of location of the UE to a client entity, wherein the periodic request includes first periodic location information indicative of when to send location estimates for the UE to the client entity;

receiving signaling sent by the RAN to initiate periodic reporting of the location of the UE to the client entity, wherein the signaling received from the RAN includes a second periodic location information indicative of when to send location estimates for the UE to the client entity, and wherein the RAN coordinates and controls the periodic reporting of UE location to the client entity;

sending location information to the RAN for each location reporting indicated by the second periodic location information, wherein the location information comprises a location estimate for the UE or measurements used to derive the location estimate for the UE; and and receiving signaling after each location reporting to convey results of a prior location reporting, to allow for cancellation of the periodic reporting.

41. The method of claim 40, wherein the second periodic location information indicates a predetermined number of location reporting and a time interval between successive location reporting.

42. The method of claim 40, wherein the second periodic location information indicates at least one condition triggering reporting of location information.

43. The method of claim 40, further comprising:

receiving via the RAN a request sent by the client entity for periodic reporting of the UE location to the client entity; and sending a grant or denial of the request.

44. The method of claim 40, further comprising:

receiving via the RAN a request sent by the client entity for periodic reporting of the UE location to the client entity, wherein the client entity resides within a network entity supporting location services or is directly coupled to the network entity.

45. The method of claim 40, further comprising:

sending a request for periodic reporting of the UE location to the client entity; and receiving authorization for the request.

46. The method of claim 40, further comprising:

receiving via the RAN assistance data for making the measurements; and using the assistance data to make the measurements for each location reporting.

47. The method of claim 40, further comprising:

making measurements for at least one transmitter for each location reporting, wherein each transmitter is a base station or a satellite; and providing the measurements as the location information.

48. The method of claim 40, further comprising:

making measurements for at least one transmitter for each location reporting, wherein each transmitter is a base station or a satellite;

deriving the location estimate for the UE based on the measurements; and providing the location estimate as the location information.

49. The method of claim 40, wherein the location information comprises measurements used to derive the location estimate for the UE, the method further comprising:

receiving via the RAN the location estimate for the UE for each location reporting.

50. An apparatus comprising:

a transceiver operative to facilitate communication between a user equipment (UE) and a radio access network (RAN); and a processor operative to send a periodic request from the UE to a network entity via the RAN to initiate periodic reporting of location of the UE to a client entity wherein the periodic request includes first periodic location information indicative of when to send location estimates for the UE to the client entity and receive signaling sent by the RAN to initiate periodic reporting of the location of the UE to the client entity, to determine when to send location estimates for the UE to the client entity based on a second periodic location information included in the signaling received from the RAN, and for each location reporting indicated by the second periodic location information, to provide a location estimate for the UE or measurements used to derive the location estimate as location information, and to send the location information to the RAN, and to receive signaling after each location reporting to convey results of a prior location reporting, to allow for cancellation of the periodic reporting, wherein the RAN coordinates and controls the periodic reporting of UE location to the client entity.

51. The apparatus of claim 50, wherein the processor is operative, for each location reporting, to obtain measurements for at least one transmitter and to provide the measurements as the location information, and wherein each transmitter is a base station or a satellite.

52. The apparatus of claim 50, wherein the processor is operative, for each location reporting, to obtain measurements for at least one transmitter, to derive the location estimate for the UE based on the measurements, and to provide the location estimate as the location information, and wherein each transmitter is a base station or a satellite.

53. The apparatus of claim 50, wherein the network entity is a mobile services switching center (MSC) or a serving GPRS support node (SGSN).

54. An apparatus comprising:
  means for sending a periodic request from a user equipment (UE) to a network entity via a radio access network (RAN) to initiate periodic reporting of location of the UE to a client entity wherein the periodic request includes first periodic location information indicative of when to send location estimates for the UE to the client entity;
  means for receiving signaling sent by the RAN to initiate periodic reporting of the location of the UE to the client entity, wherein the signaling received from the RAN includes second periodic location information indicative of when to send location estimates for the UE to the client entity, and wherein the RAN coordinates and controls the periodic reporting of UE location to the client entity; and
  means for sending location information to the RAN for each location reporting indicated by the second periodic location information, wherein the location information comprises a location estimate for the UE or measurements used to derive the location estimate for the UE; and
  means for receiving signaling after each location reporting to convey results of a prior location reporting, to allow for cancellation of the periodic reporting.

55. The apparatus of claim 54, further comprising:
  means for making measurements for at least one transmitter for each location reporting, wherein each transmitter is a base station or a satellite; and
  means for providing the measurements as the location information.

56. The apparatus of claim 54, further comprising:
  means for making measurements for at least one transmitter for each location reporting, wherein each transmitter is a base station or a satellite;
  means for deriving the location estimate for the UE based on the measurements; and
  means for providing the location estimate as the location information.

* * * * *